United States Patent
Miyashita et al.

[11] Patent Number: 5,759,643
[45] Date of Patent: Jun. 2, 1998

[54] POLARIZING PLATE AND METHOD OF PRODUCTION

[75] Inventors: Satoru Miyashita; Kogo Endo; Etsuo Okaue; Mikito Nakajima; Takao Mogami; Satoshi Kubota, all of Suwa, Japan

[73] Assignee: Seiko Epson Corporation, Tokyo, Japan

[21] Appl. No.: 572,270

[22] Filed: Dec. 13, 1995

Related U.S. Application Data

[60] Division of Ser. No. 324,066, Oct. 14, 1994, which is a continuation-in-part of Ser. No. 183,105, Jan. 18, 1994, Pat. No. 5,622,784, which is a continuation of Ser. No. 20,181, Feb. 16, 1993, abandoned, which is a continuation of Ser. No. 759,990, Sep. 16, 1991, abandoned, which is a continuation of Ser. No. 3,883, Jan. 16, 1987, abandoned.

Foreign Application Priority Data

Apr. 15, 1994 [JP] Japan .................. 6-102080

[51] Int. Cl.$^6$ .................. C09K 19/00
[52] U.S. Cl. .................. 428/1; 428/447; 428/450; 428/451
[58] Field of Search .................. 428/1, 447, 450, 428/451

[56] References Cited

U.S. PATENT DOCUMENTS

| | | | |
|---|---|---|---|
| 2,553,314 | 5/1951 | Haber | 428/429 |
| 3,012,006 | 12/1961 | Holbrook et al. | 428/391 |
| 3,244,541 | 4/1966 | Fain et al. | 106/13 |
| 3,442,664 | 5/1969 | Heine | 106/2 |
| 3,579,540 | 5/1971 | Ohlhausen | 523/169 |
| 3,900,672 | 8/1975 | Hammond et al. | 428/334 |
| 3,959,563 | 5/1976 | Vaughn, Jr. et al. | 428/429 |
| 4,085,248 | 4/1978 | Zehender et al. | 428/336 |
| 4,196,246 | 4/1980 | Takayama et al. | 428/213 |
| 4,267,213 | 5/1981 | Beck et al. | 427/292 |
| 4,338,377 | 7/1982 | Beck et al. | 428/428 |
| 4,410,563 | 10/1983 | Richter et al. | 427/108 |
| 4,599,272 | 7/1986 | Ichikawa | 428/412 |
| 4,609,267 | 9/1986 | Deguchi et al. | 351/163 |
| 4,944,962 | 7/1990 | Furuta et al. | 427/164 |
| 5,061,769 | 10/1991 | Aharoni | 526/245 |
| 5,178,955 | 1/1993 | Aharoni et al. | 428/421 |
| 5,225,244 | 7/1993 | Aharoni et al. | 427/240 |

FOREIGN PATENT DOCUMENTS

| | | |
|---|---|---|
| 2 587 529 | 1/1994 | France . |
| 37 01 654 | 7/1987 | Germany . |
| 52-26382 | 2/1977 | Japan . |
| 54-23557 | 2/1979 | Japan . |
| 56-86980 | 7/1981 | Japan . |
| 57-47330 | 3/1982 | Japan . |
| 58-172245 | 10/1983 | Japan . |
| 58-211701 | 12/1983 | Japan . |
| 59-13201 | 1/1984 | Japan . |
| 59-39714 | 3/1984 | Japan . |
| 59-231501 | 12/1984 | Japan . |
| 60-258190 | 12/1985 | Japan . |

(List continued on next page.)

OTHER PUBLICATIONS

Chemical Abstracts, vol. 107, No. 18, p. 4, 2 Nov. 1987.
World Surface Coatings Astracts, vol. 57, No. 499, p. 4, Jan. 1984.
954,010, Jan. 4, 1977, Brunner, F.C. (cited in corresponding foreign search report filed in Application Serial No. 07/759, 990 on Jun. 15, 1992)

*Primary Examiner*—D. S. Nakarani
*Attorney, Agent, or Firm*—Stroock & Stroock & Lavan LLP

[57] ABSTRACT

A polarizer plate including a polarizer substrate formed of a polarizer layer and supporting layers disposed on opposite surfaces of the polarizer layer; an undercoat layer disposed on one surface of the polarizer substrate; an anti-reflection layer disposed on the undercoat layer; and an anti-staining layer including a fluorine-containing silane compound disposed on said anti-reflection layer. The undercoat layer preferably has a specular glossiness according to JIS Z 8741 of from 10 to 40 and a haze according to JIS K 6900 of from 5 to 30%.

43 Claims, 2 Drawing Sheets

FOREIGN PATENT DOCUMENTS

| | | |
|---|---|---|
| 61-130902 | 6/1986 | Japan . |
| 62-80603 | 4/1987 | Japan . |
| 62-148902 | 7/1987 | Japan . |
| 62-169102 | 7/1987 | Japan . |
| 62-178902 | 8/1987 | Japan . |
| 62-178903 | 8/1987 | Japan . |
| 62-247302 | 10/1987 | Japan . |
| 63-214701 | 9/1988 | Japan . |
| 63-228101 | 9/1988 | Japan . |
| '64-9222 | 1/1989 | Japan . |
| 1-86101 | 3/1989 | Japan . |
| 1-149808 | 6/1989 | Japan . |
| 1-200203 | 8/1989 | Japan . |
| 1-239501 | 9/1989 | Japan . |
| 1-309003 | 12/1989 | Japan . |
| 2-671 | 1/1990 | Japan . |
| 2-87101 | 3/1990 | Japan . |
| 2-130501 | 5/1990 | Japan . |
| 2-181701 | 7/1990 | Japan . |
| 2-197801 | 8/1990 | Japan . |
| 2-248480 | 10/1990 | Japan . |
| 3-148603 | 6/1991 | Japan . |
| 3-195757 | 8/1991 | Japan . |
| 3-266801 | 11/1991 | Japan . |
| 4-72055 | 3/1992 | Japan . |
| 1-257801 | 10/1996 | Japan . |

POLARIZING PLATE AND METHOD OF PRODUCTION

CROSS REFERENCE TO RELATED APPLICATIONS

This application is a divisional of application Ser. No. 08/324,066, filed on Oct. 14, 1994, which itself is a continuation-in-part of Ser. No. 08/183,105, filed Jan. 18, 1994, now U.S. Pat. No. 5,622,784, which is a continuation of Ser. No. 08/020,181, filed Feb. 16, 1993 (abandoned), which is a continuation of Ser. No. 07/759,990, filed Sep. 16, 1991 (abandoned), which is a continuation of Ser. No. 07/003,883, filed Jan. 16, 1987 (abandoned).

BACKGROUND OF THE INVENTION

This invention relates generally to a plate for polarizing light and more particularly, to a polarizer plate and a method for producing a polarizer plate adapted for use in a liquid crystal display. Liquid crystal cells operate by rotating polarized light and accordingly, a polarizer plate is typically positioned at the front of a liquid crystal panel.

In liquid crystal displays, the visibility of the information displayed, and in particular, the visibility of the display outdoors has been improved by reducing the surface reflection of the polarizer plates. This has been achieved, for example, by providing an anti-reflection film over the display. Such an anti-reflection film may be formed by: depositing an inorganic coating film on the polarizer plate by methods such as vacuum evaporation, ion plating, and spattering; or by adhering an acrylic resin film having such an anti-reflection film formed thereon to the polarizer plate with an adhesive.

Conventional polarizer plates having an anti-reflection film formed thereon, however, suffer from problems such as adhesion of dirt and finger prints on the surface which are difficult to remove; and attraction of water droplets on the surface. When the water droplets are not removed from the surface of the polarizer plate, so called "burn", which is the stained trace of water, is formed in a relatively short period of time. Moreover, when the water droplets are left on the surface of the polarizer plate at an elevated temperature, cracks in the anti-reflection film or peeling of the anti-reflection film is likely to be induced.

Japanese Patent Application Laid-Open No. 3-266801 describes a technique wherein a thin film of a fluororesin is formed on the anti-reflection film of a polarizer plate. The thin film can be formed of polytetrafluoroethylene (PTFE), polyvinyl fluoride, and the like. The film can be formed by vacuum evaporation using resistance heating. However, such a film is unsuitable for practical use since it suffers from inadequate adhesion, strength, surface hardness, and the like. If the film is deposited by such technique to a film thickness sufficient to provide the film with sufficient strength, the resulting film can adversely affect the optical properties of the polarizer plate and lead to new problems such as increased reflectance, coloring caused by the interference of light, and poor visibility due to inconsistent film thickness.

Accordingly, it is desirable to provide a polarizer plate and method of production that overcomes the inadequacies of the prior art.

SUMMARY OF THE INVENTION

Generally speaking, in accordance with the invention, a polarizer plate is provided in which an anti-staining layer including a fluorine-containing silane compound is formed as the outermost layer. The polarizer plate is formed with a polarizer substrate including a polarizer layer having a support layer disposed on both surfaces thereof. An undercoat layer can be disposed on one of the support layers of the polarizer substrate and the anti-staining layer is disposed on the undercoat layer. An anti-reflection layer can be included between the polarizer substrate and the anti-staining layer. Such a polarizer plate can be used in a liquid crystal display.

Accordingly, it is an object of the present invention to provide a polarizer plate that overcomes inadequecies of the prior art.

Another object of the present invention is to provide a polarizer plate for a liquid crystal display which exhibits little surface reflection and excellent visibility.

Still another object of the present invention is to provide a polarizer plate that resists staining and is easy to keep clean.

Yet another object of the present invention is to provide a method for producing such polarizer plate.

Still other objects and advantages of the invention will in part be obvious and will in part be apparent from the specification and drawings.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
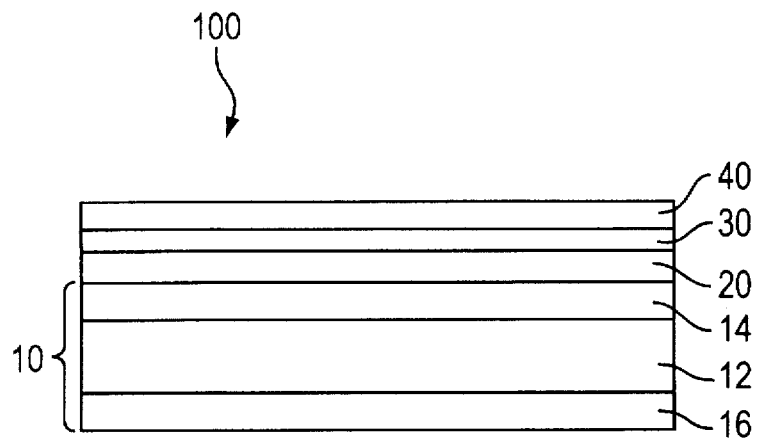
FIG. 1 is a schematic cross sectional view of a polarizer plate according to an embodiment of the present invention.

There are many applications for plates having layers that can polarize light (hereinafter "polarizer plates"). One important application is for use in a liquid crystal display ("LCD"). The polarizer plate of a liquid crystal display has characteristics well known to those of ordinary skill in the art. The polarizer plate of an LCD is commonly the outermost layer and accordingly, it has become popular to dispose an anti-reflection layer on the outside surface of the polarizer plate.

The anti-reflection layer generally includes a film of an inorganic substance such as an $SiO_2$ film wherein OH groups of high polarity are exposed on the surface. It has been determined that exposure of these active groups on the surface invites the deposition of dirt and water droplets. Thus, such plates are easily stained.

It has been determined that the surface of the polarizer plate may be suitably modified to resist staining by bringing the surface into a chemically stable condition by depositing a fluorine-containing silane compound having very low polarity on the anti-reflection layer through reaction or adsorption.

A polarizer plate in accordance with a preferred embodiment of the invention is formed with a polarizer substrate including a polarizer layer having a support layer disposed on both surfaces thereof. An undercoat layer can be disposed on one of the support layers of the polarizer substrate and an outermost anti-staining layer can be disposed on the undercoat layer.

The anti-staining layer comprises at least a monomolecular layer of such fluorine-containing silane compound. A film as thin as such monomolecular layer would not adversely affect the optical properties nor the surface hardness of the polarizer plate. Moreover, since the anti-staining layer and the underlying anti-reflection layer are bonded by intervening reactive substituents, their bond is strong, and the anti-staining layer would not become peeled off. It should be noted that the fluorine-containing silane compounds used in accordance with the invention are excellent in various chemical and physical properties, including resistance to chemical reagents, heat, scuffs, and exposure to exterior atmosphere.

The anti-staining layer preferably has a surface contact angle with pure water surface of at least 70°, and more preferably, at least 100°. An anti-staining layer having a contact angle within such a range can provide the polarizer plate with improved water repellency. This in turn leads to excellent anti-staining properties.

The undercoat layer can be formed with a specular glossiness as set forth in JIS (Japan Industrial Standard) Z 8741 of from 10 to 40, and preferably, from 20 to 35, and a haze according to JIS K 6900 of from 5 to 30%, and preferably, from 10 to 25%. When the undercoat layer has a specular glossiness and a haze within such ranges, the resulting polarizer plate will have improved visibility with reduced image reflection and glitter on its surface while dirt and fingerprints on its surface can be easily rubbed off, as will be described below.

As used herein, the term, specular glossiness (hereinafter sometimes referred to as glossiness) designates the degree of glossiness according to JIS Z 8741, method 3 (specular glossiness at 60°). When the glossiness is less than 10, surface irregularity of the undercoat layer can be too dense, and removal of dirt and fingerprints on the surface of the polarizer plate can be difficult. On the other hand, when the glossiness is higher than 40, incident light beams can be regularly reflected to result in glitter of the polarizer plate surface, leading to poor visibility.

As used herein, the term haze designates the haze according to JIS K 6900-113, which is the proportion of the dispersion of the incident light in a transparent body, represented in terms of the proportion of the dispersed transmitted light in the total transmitted light in percentage. In the present invention, a haze of the undercoat layer of less than 5 will lead to a specular surface of the resulting polarizer plate, and the polarizer plate will have a poor visibility due to significant phenomenon of reflected images. On the other hand, a haze of higher than 30 will result in conditions of the polarizer plate surface comparable to those of a frosted glass, leading to a low resolution, and hence, poor visibility, as well as darkening due to the reduced parallel transmittance.

In the polarizer plate of the present invention, the undercoat layer may desirably have a center line average coarseness (Ra) according to JIS B 0601 of from 100 to 500 nm, and more preferably, from 150 to 300 nm. When the center line average coarseness is within the above-specified range, reflection of images and glittering on the surface may be reduced while the dirt and fingerprints on the surface may be easily rubbed off.

The fluorine-containing silane compound that is used for the above-described anti-staining layer preferably includes at least a fluorine-containing silane compound represented by the following formula (1):

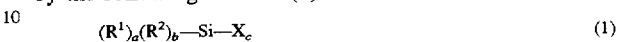

$$(R^1)_a(R^2)_b\text{—Si—}X_c \qquad (1)$$

and oligomers and polymers containing such compound as their unit.

In formula (1), $R^1$ is a fluorine-containing organic group;

$R^2$ is hydrogen or an organic group;

X is at least one hydrolyzable reactive group selected from: halogen groups, unsubstituted or partly substituted hydroxyl groups, amino groups, and alkoxy groups;

a is an integer of from 1 to 3;

b is an integer less than three (0, 1 or 2); and c is an integer of from 1 to 3.

In the fluorine-containing silane compound represented by formula (1), the reactive group X is preferably an unsubstituted or a substituted amino group.

Such aminosilane compounds include:
1H,1H,2H,2H-perfluorodecyltriaminosilane,
1H,1H,2H,2H-perfluorodecyldimethylaminosilane,
bis(1H,1H-perfluorobutyl)diaminosilane,
bis(perfluorononyl)diaminosilane,
perfluorohexadecyltriaminosilane,
perfluoroheptadecyltriaminosilane,
perfluorooctadecyltriaminosilane, and
bis(perfluorononyl)butylaminosilane.

These may be used either alone or in compatible combinations of two or more.

In the fluorine-containing silane compound represented by formula (1), it is also desirable that:

$R^1$ is an unsubstituted or a substituted fluorine-containing alkyl or alkoxy group having 1 to 20 carbon atoms;

$R^2$ is hydrogen or an unsubstituted or substituted alkyl or alkoxy group having 1 to 4 carbon atoms; and X is at lest one reactive group selected from a halogen groups, and unsubstituted and partly substituted hydroxyl and alkoxy groups.

Such fluorine-containing silane compounds include:
1H,1H,2H,2H-perfluorodecyltrichlorosilane,
1H,1H,2H,2H-perfluorodecyltribromosilane,
1H,1H,2H,2H-perfluorodecyltriethoxysilane,
1H,1H,2H,2H-perfluorodecyltrihydroxysilane,
perfluoroheptadecyltrimethoxysilane,
perfluorooctadecyldimethylchlorosilane,
perfluorohexadecylmethyldichlorosilane, and
3,3,3-trifluoropropyltrichlorosilane.

These may be used either alone or in compatible combinations of two or more.

Of the above-mentioned fluorine-containing silane compounds, aminosilane compounds undergo a reaction at a temperature of from room temperature to 80° C. Therefore, reaction control and handling as well as management of the reaction solution are easier than with other silane compounds. Therefore, use of an aminosilane compound is advantageous.

The flourine-containing compound represented by the above-described formula (1) may undergo oligomerization or polymerization by the binding of the monomeric compounds before the reaction. The compound, however, can be stored under cold, dark conditions to control such oligomerization or polymerization to an extent that would not interfere with the objects of the invention.

The undercoat layer may desirably have dispersed therein hard particles having an average particle size of from 0.1 to 5 μm, and more preferably, from 0.5 to 2 μm in an amount of, for example, from 1 to 50% by weight of the undercoat layer. Hard particles having an average particle size of less than 0.1 μm can be insufficient to provide an antiglare effect. Hard particles having an average particle size of more than 5 μm can result in glitter, and hence, poor visibility. When more than 50% by weight hard particles are dispersed in the undercoat layer, the resolution of the polarizer plate can be decreased and dirt and fingerprints can be difficult to rub off.

The amount of the hard particles dispersed is typically not limited to any further particular range, and the amount dispersed may be suitably determined so that the resulting undercoat layer will meet the above-described requirements imposed on the properties of the undercoat layer.

The hard particles may typically be silica, which is used in antiglare treatments. Other hard particles that may be used include titania, alumina, and zirconia.

The undercoat layer can be formed from a resin such as an acrylic resin or a siloxane resin. Non-limiting exemplary acrylic resins are polymeric acrylates such as urethane acrylate, ester acrylate, epoxy acrylate, and ether acrylate. An alkoxysilane may be used for the siloxane resin, and exemplary nonlimiting siloxane resins are those containing an organic group, for example, an alkyl group such as methyl or ethyl, γ-chloropropyl, vinyl, 3,3,3-trifluoropropyl, γ-glycidoxypropyl, or γ-methacryloxypropyl.

In the polarizer plate of the present invention, the anti-staining layer may desirably have a refractive index, n and a thickness of the layer, d, which satisfy the following relations:

$$nd<0.1 \ \mu m,$$

and $$1.25<n<1.45.$$

The layer of the fluorine-containing silane compound which constitutes the anti-staining layer generally has a refractive index as low as 1.25 to 1.45. The anti-staining layer should also have anti-reflection properties in addition to the anti-staining properties. In the case of the present invention, the anti-staining layer generally exhibits A-type interference color (when the refractive index of the film is smaller than that of the substrate), and hue is given as a function, nd. With an increase in the thickness, d of the anti-staining layer, the interference color sequentially changes from white to yellow, red, violet, blue and green.

When spectral color tristimulus values are calculated from theoretical relations by taking the above-described conditions of the polarizer substrate and the anti-reflection layer into consideration, a value of nd=0.1 μm or more will result in the value of x in color coordinates (x, y) of more than 0.45, and coloring of the anti-staining layer is then observed. Furthermore, when nd is 0.1 μm or more and the anti-staining layer has an inconsistent thickness, an irregular multi-color pattern that is often observed in soap bubbles can be seen in the resulting polarizer plate. In consideration of the above-described conditions, the anti-staining layer should preferably have a thickness, d of less than 0.1 μm.

To prepare a polarizer plate according to the present invention, the following steps can be performed:

provide a polarizer layer;

dispose supporting layers on opposite surfaces of the polarizer layer to form a polarizer substrate;

dispose an undercoat layer on the surface of one of the supporting layers of the polarizer substrate;

form an anti-reflection layer on the undercoat layer; and form an anti-staining layer on the anti-reflection layer, said anti-staining layer including a fluorine-containing silane compound.

The process of forming the undercoat layer can include the steps of preparing a coating solution which includes a resin solution having dispersed therein hard particles of an average particle size of from 0.1 to 5 μm; applying said coating solution on said polarizer substrate; and allowing the coated solution to cure to thereby form a coated film containing said hard particles at a content of 1 to 50% by weight.

The resin used for the resin solution can be one of the resins described above such as an acrylic resin or a siloxane resin.

Since the hard particles are dispersed in the undercoat layer, the undercoat layer is capable of providing the polarizer plate with antiglare properties.

The coating solution may be applied onto the polarizer substrate by any of the commonly employed coating processes such as roll coating, dipping, spin coating, and spraying. Roll coating is preferred in view of its mass-production susceptibility. The coated film may be cured by heating the film or by irradiating the film with ultraviolet light or electron rays to thereby promote the crosslinking of the resin.

Other methods for providing the undercoat layer with anti-glare properties include: (a) a method wherein an undercoat layer free from hard particles is formed in an etched mold by hard coat treatment, and the thus formed undercoat layer is transferred onto the polarizer substrate by cast polymerization; (b) a method wherein a coating solution which may optionally contain the hard particles is sprayed onto the polarizer substrate to form the undercoat layer, with the droplets of the sprayed coating solution being adequately regulated; and (c) a method wherein an undercoat layer free from the hard particles is formed on the polarizer substrate, and a roll with minute surface irregularities is pressed and rolled against the undercoat layer to thereby transfer the irregular pattern of the roll onto the surface of the undercoat layer.

The anti-staining layer can be formed by coating the surface of the anti-reflection layer with a coating solution containing at least one of the fluorine-containing silane compounds represented by the above-described formula (1); an oligomer and a polymer containing the unit represented by formula (1); curing the coated solution; and removing the fluorine-containing silane compound that failed to undergo the curing reaction by washing the surface with a solvent to thereby leave the cured film.

The coating solution may be prepared by dissolving the fluorine-containing silane compound in a solvent to a concentration of from 0.01 to 10% by weight. Typical solvents which may be used for the preparation of the coating solution include perfluorohexane, perfluoroheptane, perfluorooctane, perfluoro-1,3-dimethylcyclohexane, and perfluorodimethyldecahydronaphthalene.

Alternatively, the anti-staining layer may be formed by depositing the fluorine-containing silane compound of the above-described formula (1) by means of physical vapor deposition such as vacuum vapor deposition (vacuum evaporation), ion plating, or spattering, which are commonly used in the art. Preferably, the anti-staining layer is deposited by vacuum vapor deposition.

When the anti-staining layer is formed by physical vapor deposition, the anti-reflection layer and the anti-staining layer may be continuously formed by employing the same deposition method.

When the anti-staining layer is formed by vacuum vapor deposition, the deposition may be desirably effected by (a) using a ceramic tablet having impregnated therein the fluorine-containing silane compound of the above-described formula (1) for the evaporation source; and (b) heating said ceramic tablet in a vacuum chamber to evaporate said fluorine-containing silane compound.

If desired, the anti-reflection layer may be subjected to a pretreatment such as washing, deaeration, chemical treatment, or plasma treatment before the formation of the anti-staining layer.

The anti-reflection layer may have a monolayered structure comprising a layer of ultra-low refractive index, or a multilayered structure comprising a combination of layers respectively having low and high refractive indexes. Such an anti-reflection layer is capable of efficiently reducing the reflection. Exemplary substances that may be used for forming the layer of ultra-low refractive index include $MgF_2$, $CaF_2$, and LiF, and exemplary substances that may be used for forming the refractive layers of the multilayered structure include $SiO_2$, $ZrO_2$, $TiO_2$, $Y_2O_3$, $Ta_2O_5$, $CeO_2$, $Sb_2O_3$, $B_2O_3$, SiO, and $CeF_3$.

Alternatively, the anti-reflection layer may also be formed by using particular resins or particular amorphous substances instead of the fluorides and the oxides described above. For example, the layer of ultra-low refractive index may be produced by using an acrylic resin having a fluorine-containing substituent introduced therein, or by forming a porous silica-based amorphous substance by sol-gel process. The layers having low and high refractive indexes may be relatively easily formed by introducing a suitable substituent in a siloxane resin or an acrylic resin, or by controlling the type and the mixing ratio of the oxide particles dispersed in the layer to thereby adjust the refractive index of the layer in the range of from 1.45 to 1.65. When a film having a higher refractive index is desired, such layer may be produced, for example, by forming a titania-based amorphous substance by a sol-gel process.

When the anti-reflection layer is formed by using the latter resin or amorphous substance, the coating solution may be prepared by using a solvent such as an alcoholic solvent or a fluorosolvent. Typical alcoholic solvents include 2-ethoxyethanol, 2-methoxyethanol, and isopropylalcohol; and typical fluorosolvents include perfluoroheptane.

The invention will be described more particularly with reference to the following embodiments and the specific examples included within each embodiment. The specific chemicals, thicknesses and other characteristics of the polarizer plates prepared as set forth in these embodiments and examples are presented for purposes of illustration only and are not intended to be construed in a limiting sense.

EMBODIMENT 1 AND EXAMPLE 1

FIG. 1 is a schematic cross sectional view of a polarizer plate 100 formed in accordance with Embodiment 1. Polarizer plate 100 has a structure including a polarizer substrate 10, an undercoat layer 20 disposed on polarizer substrate 10, an anti-reflection layer 30 disposed on undercoat layer 20, and an anti-staining layer 40 disposed on anti-reflection layer 30.

Polarizer substrate 10 can be formed with a polarizer layer 12 which includes a polarizing material such as an iodine compound or a dye that exhibits dichroism fixedly adsorbed on a polarizing matrix formed of a material such as polyvinylalcohol. Polarizer substrate 10 also includes a first supporting layer 14 adhered to one surface of substrate 10 and a second supporting layer 16 adhered to the opposite surface of polarizer substrate 10 with an adhesive.

Supporting layers 14 and 16 are typically formed of a film of cellulose such as triacetylcellulose (TAC). Polarizer layer 12 is chemically and physically protected by supporting layers 14 and 16. Polarizer substrate 10 typically has a thickness of from 20 to 200 µm, and supporting layers 14 and 16 typically have a thickness of from 20 to 200 µm.

Undercoat layer 20 disposed on polarizer substrate 10 is a film having a thickness of from 0.5 to 20 µm (3 µm in the case of the sample (Example 1) used for the evaluation as described below). Undercoat layer 20 is formed of a film of an acrylic resin having silica particles ($SiO_2$) dispersed therein for providing antiglare properties with the film. The silica dispersed has an average particle size of from 0.1 to 5 µm (2 µm in the sample (Example 1)), and the amount added is from 1 to 50% by weight of the acrylic resin (25% by weight in the sample).

Undercoat layer 20 of this example had a surface hardness in terms of pencil hardness of 3H, glossiness at 60°, Gs (60°) of 26, a center line average coarseness, Ra of 220 nm, and a haze of 20%.

Anti-reflection layer 30 disposed on undercoat layer 20 has a thickness of from 0.05 to 1 µm (0.3 µm in the sample (Example 1)). Anti-reflection layer 30 was constructed with a five layer structure comprising, from the side of undercoat layer 20, an $SiO_2$ layer of λ/4; a laminate of $ZrO_2$ and $SiO_2$ layers of λ/4; a $ZrO_2$ layer of λ/4; and an outermost $SiO_2$ layer of λ/4 (provided that λ is 520 nm).

Anti-reflection layer 30 should have an average reflectance in visible region of up to 0.5%.

Anti-staining layer 40 disposed on anti-reflection layer 30 was formed of a layer of 1H,1H,2H,2H-perfluorodecyltrichlorosilane having a thickness of from 20 to 800 Å (up to 100 Å in the sample (Example 1)). The anti-staining layer 40 may be a monomolecular layer or a layer of up to several molecules in thickness. Anti-staining layer 40 had a contact angle with water of at least 100° to exhibit good water repellency. Anti-staining layer 40 also had a refractive index, n of from 1.25 to 1.45, and accordingly, the nd (d: thickness of anti-staining layer 40) was confirmed to be smaller than 0.1 µm.

Polarizer plate 100 of this example was produced as described below.

A coating solution including an acrylic resin having silica particles dispersed therein was prepared by diluting urethane acrylate oligomer with methacrylic acid monomer, and adding benzoin ether (a photoinitiator) and silica particles to the diluent. The thus prepared coating solution was roll coated onto one surface of polarizer substrate 10. The acrylic resin was cured by irradiating with ultraviolet light to form undercoat layer 20.

Next, polarizer substrate 10 having undercoat layer 20 deposited thereon was placed in a vacuum chamber. An $SiO_2$ layer of λ/4; a laminate of $ZrO_2$ and $SiO_2$ layers of λ/4; a $ZrO_2$ layer of λ/4; and an $SiO_2$ layer of λ/4 (λ=520 nm) were then deposited (in this order) by vacuum evaporation at a substrate temperature of 50° C. to form anti-reflection layer 30. The resulting unfinished polarizer plate was washed with methanol and fully dried.

The dried plate was dipped in 5% by weight Florinate FC-40 (manufactured by Sumitomo 3M) solution of 1H,1H, 2H.2H-perfluorodecyltrichlorosilane, which is an amine perfluorosolvent, at 20° C. for 1 minute. The plate was removed from the solution at a speed of 10 cm/sec., and allowed to stand in an atmosphere at a relative humidity of 50% and a temperature of 50° C. for 10 minutes. The resulting polarizer plate was then washed with Florinate FC-40 to remove the residual fluorine-containing silane compound which failed to undergo the reaction.

The fluorine-containing silane compound does not react with the triacetyl cellulose (TAC) that constitutes supporting layers 14 and 16 of polarizer substrate 10. Therefore, the fluorine-containing silane compound on second supporting layer 16 that has not undergone any reaction with layer 16 can be removed by washing the plate with the fluorosolvent. After the washing, the layer of the fluorine-containing silane compound that had formed on second supporting layer 16 during the dipping of the plate is no longer present on second supporting layer 16. As a result, the polarizer plate can be easily bonded to the liquid crystal panel.

The polarizer plate did not undergo any specific change in its appearance or anti-reflection properties by the deposition of anti-staining layer 40 to form polarizer plate 100.

The thus produced polarizer plate 100 and a liquid crystal display panel prepared with polarizer plate 100 were evaluated for their properties.

(1) Properties of the polarizer plate

The sample (Example 1) used for the evaluation of the properties was polarizer plate 100 that had been prepared by using the conditions such as the film thickness as indicated in parenthesis in this Embodiment.

a. Adhesion

The adhesion of anti-staining layer 40 to the underlying layer was evaluated by a crosshatch adhesion test. The crosshatch adhesion test was carried out by forming perpendicularly intersecting parallel cuts in the surface of the polarizer plate 100 at an interval of 1 mm with a knife to form 100 minute squares defined by the cuts. Adhesive tape is then pressed on the surface of the plate and then peeled off the surface to evaluate the adhesion of crosshatched anti-staining layer 40.

The surface of polarizer plate 100 was then evaluated by observation under a reflection microscope and by the degree of the surface wetting upon dripping of pure water and ethanol onto the surface.

No surface peeling was observed in the crosshatch adhesion test of polarizer plate 100 of this example. Such results indicate the excellent adhesion of anti-staining layer 40 to underlying layer 30.

b. Scuff resistance

Polarizer plate 100 was evaluated for scuff resistance by placing #0000 steel wool on the surface of anti-staining layer 40; moving the steel wool back and forth ten times under a load of 1 kg/cm$^2$; and visually inspecting the surface for scuffs.

Substantially no scuffs were observed in the surface of layer 40 to demonstrate the excellent scuff resistance of polarizer plate 100 of this example.

c. Chemical resistance

Polarizer plate 100 was evaluated for its resistance to an alcohol, an acid, an alkali, and a detergent.

Alcohol resistance was evaluated by dripping methylalcohol onto the surface of polarizer plate 100, and visually observing the appearance of the surface after 30 minutes.

Acid resistance was evaluated by dripping a 5% by weight aqueous solution of hydrochloric acid onto the surface of polarizer plate 100, and visually observing the appearance after 30 minutes.

Alkaline resistance was evaluated by dripping a 5% by weight aqueous solution of sodium hydroxide onto the surface of polarizer plate 100, and visually observing the appearance after 30 minutes.

Resistance to detergent was evaluated by dripping a 5% by weight aqueous solution of neutral detergent onto the surface of polarizer plate 100, and visually observing the appearance after 24 hours.

No failure, such as deformation, discoloration, or stain was noted in the tests with these various chemical reagents. This demonstrates the excellent chemical resistance of polarizer plate 100 of this example.

d. Anti-staining properties

In this test, a finger was pressed against the surface of the polarizer plate to evaluate fingerprint resistance and removability of any fingerprint that had formed.

It was confirmed that fingerprints were less likely to form on the polarizer plate of this example, and that once formed, fingerprints could be easily rubbed off with materials such as fabric. In addition, the polarizer plate could easily restore its initial state by cleaning with a neutral detergent or a commercially available cleaner for eye glasses.

(2) Properties of the liquid crystal display panel

The sample liquid crystal display panel used for the evaluation of the properties as described below was an active matrix drive liquid crystal panel utilizing MIM (metal-insulation-metal) elements, and the polarizer plate used for the above-described evaluation disposed on the front surface of the liquid crystal panel. The sample liquid crystal display panel included a twisted nematic (TN) liquid crystal material sandwiched between a glass substrate having a color filter formed thereon and a glass substrate having MIM elements formed thereon. The polarizer plate of this example adhered to the glass substrate having the color filter formed thereon and a conventional polarizer plate adhered to the glass substrate having the MIM elements formed thereon.

a. High-humidity, high-temperature test

The sample liquid crystal display panel was left in an atmosphere at a temperature of 50° C. and a relative humidity of 90% for 1,000 hours. The sample panel was then evaluated for various properties including outer appearance.

The polarizer plate of the sample panel did not exhibit any peeling of the surface layer, cracks, or discoloration.

b. Thermal shock test

The sample panel was exposed to 10 cycles of –20° C. for 30 minutes, 25° C. for 5 minutes, and 60° C. for 30 minutes. The sample panel was then evaluated for its outer appearance and various other properties.

The sample liquid crystal display panel exhibited no specific abnormality in its electric properties and optical properties.

c. Daylight exposure test

The sample panel was left in the outer atmosphere for 20,000 hours. The sample panel was then evaluated for its outer appearance and various other properties.

The sample panel of this example exhibited no specific abnormality in its electric properties and optical properties.

d. Visibility

A backlight unit was positioned in the back of the sample liquid crystal display panel to produce a liquid crystal display device of the backlit type. In this device, an image was driven on the display by the MIM elements, and the image could be excellently recognized with little surface reflection.

EMBODIMENT 2 AND EXAMPLE 2

Figure 2:
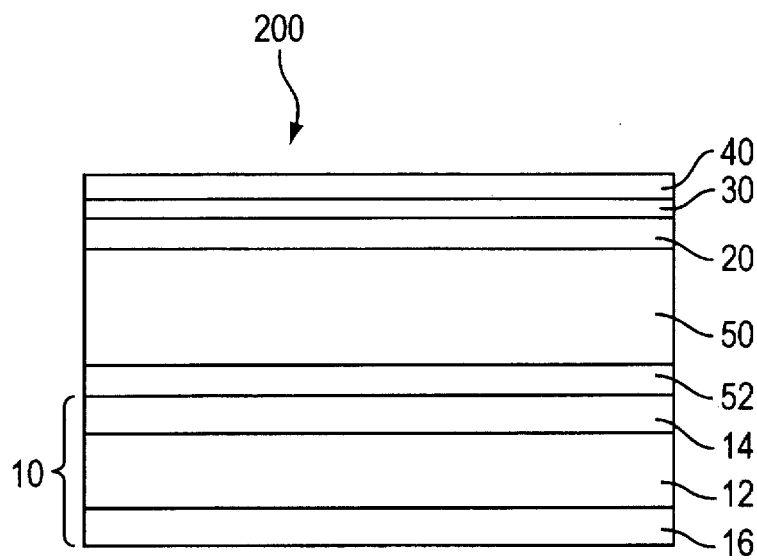
FIG. 2 is a schematic cross sectional view of a polarizer plate according to another embodiment of the present invention.

FIG. 2 is a schematic cross sectional view of a polarizer plate 200 of this second embodiment of the invention. Polarizer plate 200 has a structure including:

a polarizer substrate 10;

a resin film 50 disposed on polarizer substrate 10 with an intervening adhesive layer 52;

an undercoat layer 20 on resin film 50;

an anti-reflection layer 30 on undercoat layer 20; and an anti-staining layer 40 on anti-reflection layer 30.

Polarizer plate 200 is different than polarizer plate 100 of Embodiment 1 in that undercoat layer 20, anti-reflection layer 30 and anti-staining layer 40 is preliminarily deposited on resin film 50 to form a laminate. The thus produced laminate is adhered to polarizer substrate 10 with intervening adhesive layer 52.

Polarizer substrate 10 has a construction similar to polarizer substrate 100 of Embodiment 1, and therefore, further description is omitted.

Resin film 50 is an acrylic resin film having a thickness of 0.03 to 1 mm (0.2 mm in the case of Example 2, hereinafter in this Embodiment, also referred to as "the sample", used for the evaluation as described below). Preferred acrylic resins used include polymethylmethacrylate and modified acrylic resins such as acrylate copolymers.

Undercoat layer 20 has a thickness of from 0.5 to 20 μm (5 μm in the case of the sample used for the evaluations described below) and comprises a siloxane resin having silica dispersed therein for providing antiglare properties of the film. The silica dispersed has an average particle size of from 0.1 to 5 μm (4 μm in the sample).

Undercoat layer 20 of this example had a surface hardness in terms of pencil hardness of 5H, glossiness at 60°, Gs (60°) of 48, a center line average coarseness, Ra of 980 nm, and a haze of 15%.

Anti-reflection layer 30 has a thickness of from 0.05 to 1 μm (0.3 μm in the sample). Anti-reflection layer 30 had a three layer structure comprising, from the side of undercoat layer 20, an $SiO_2$ layer of $\lambda/4$, a $TiO_2$ layer of $\lambda/2$, and an outermost $SiO_2$ layer of $\lambda/4$ (provided that $\lambda$ is 520 nm).

Anti-staining layer 40 includes a layer of bis(1H,1H-perfluorobutyl)diaminosilane having a thickness of from 20 to 800 Å (300 Å in Example 2). Anti-staining layer 40 had a contact angle with water of at least 100° to exhibit excellent water repellency. Anti-staining layer 40 also had a refractive index, n of from 1.25 to 1.45, and accordingly, the nd (d: thickness of anti-staining layer 40) was confirmed to be smaller than 0.1 μm.

Polarizer plate 200 of this example was produced as described below.

A coating solution including a siloxane resin having silica particles dispersed therein was prepared by (a) diluting γ-glycidoxypropylmethyldiethoxysilane with 2-ethoxyethanol; (b) hydrolyzing the γ-glycidoxypropylmethyldiethoxysilane with hydrochloric acid; and (c) adding silica particles, a silicone-based surfactant, and magnesium perchlorate.

The thus prepared coating solution was coated on one surface of resin film 50 by dipping resin film 50 in the coating solution. The siloxane resin was cured by heating to 70° C. to form undercoat layer 20 on resin layer 50. Next, resin film 50 having undercoat layer 20 deposited thereon was placed in a vacuum chamber. An $SiO_2$ layer of $\lambda/4$, a $TiO_2$ layers of $\lambda/2$, and an $SiO_2$ layer of $\lambda/4$ ($\lambda$=520 nm) were deposited in this order by vacuum evaporation at a substrate temperature of 50° C. to form multi-layer anti-reflection layer 30. The resulting product was washed with methanol and fully dried.

The vacuum of the vacuum chamber was retained, and a gas mixture of argon and bis(1H,1H-perfluorobutyl) diaminosilane at a mixing ratio of 9:1 was introduced into the vacuum chamber to a vacuum of 1 to 0.0001 Torr (0.01 Torr in the sample), and the atmosphere was plasmatized by applying a high frequency magnetic field of, for example, 13.56 MHz to deposit the fluorine-containing silane compound on anti-reflection layer 30 to form anti-staining layer 40.

The resulting film did not undergo any specific change in its appearance or anti-reflection properties by the deposition of anti-staining layer 40.

The thus produced resin film laminate was adhered to polarizer substrate 10 with an acrylic adhesive to produce polarizer plate 200 of this example. Adhesives other than an acrylic adhesive, such as for example, epoxy adhesive and urethane adhesive can also be employed.

The thus produced polarizer plate 200 was evaluated for its properties by repeating the evaluation procedures of Embodiment 1. Polarizer plate 200 exhibited good results comparable to those of the polarizer plate 100 of Embodiment 1 in a) adhesion, b) scuff resistance, c) chemical resistance, and d) anti-staining properties.

Next, a liquid crystal display panel was prepared by adhering polarizer plate 200 on the front surface of an active matrix drive liquid crystal panel utilizing TFT (thin film transistor) active elements. The thus produced liquid crystal display panel was subjected to a) a high-humidity, high-temperature test, b) a thermal shock test, c) a daylight exposure test and d) a visibility test by repeating the procedures of Embodiment 1. The liquid crystal display panel exhibited good results comparable to those of Embodiment 1 except for the visibility test wherein the display exhibited some glitter, and was acceptable overall.

EMBODIMENT 3 AND EXAMPLE 3

The polarizer plate of this embodiment has a structure basically the same as that of Embodiment 1. Therefore, the description thereof is made by referring to FIG. 1, with the materials of the layers prepared as follows. Throughout the application, the polarizer plates of each embodiment will have the same general structure as the polarizer plates shown in FIG. 1 or FIG. 2. Where the same element is used in different embodiments, such as the anti-staining layers of Embodiment 1 and of Embodiment 3, they will be identified by the same reference numerals, even if the particular chemicals used are different. The individual polarizer plates will be identified by appending the particular embodiment number on the reference numeral identifying the polarizer plate, e.g. polarizer plate 100(3) for the polarizer plate of this embodiment.

Polarizer plate 100 of Embodiment 3 ("polarizer plate 100(3)") has a structure including a polarizer substrate 10 having deposited thereon undercoat layer 20, anti-reflection layer 30, and anti-staining layer 40 in this order. Polarizer substrate 10 is substantially the same as the one used in Embodiment 1, and no further description is made.

Undercoat layer 20 is a film having a thickness of from 0.5 to 20 μm (7 μm in the case of the sample used for the evaluation described below (Example 3)). Undercoat layer 20 is formed of a film of an acrylic resin having silica particles dispersed therein for providing the film with anti-glare properties. The silica dispersed has an average particle size of from 0.1 to 5 μm (4 μm in the sample evaluated).

Undercoat layer 20 of this example had a surface hardness in terms of pencil hardness of 3H, glossiness at 60°, Gs (60°) of 76, a center line average coarseness, Ra of 230 nm, and a haze of 4%.

Anti-reflection layer 30 has a thickness of from 0.05 to 1 μm (0.1 μm in the sample), and a monolayer structure of an $MgF_2$ layer of $\lambda/4$ (provided that $\lambda$ is 520 nm).

Anti-staining layer 40 is formed of a layer of 2-(perfluorooctyl)-ethyltriaminosilane having a thickness of from 20 to 800 Å (up to 100 Å in the sample). Anti-staining layer 40 had a contact angle with water of at least 100° to exhibit an excellent water repellency. Anti-staining layer 40 also had a refractive index, n of from 1.25 to 1.45, and accordingly, the nd (d: thickness of anti-staining layer 40) was confirmed to be smaller than 0.1 μm.

Polarizer plate 100(3) of this example was produced as described below.

The coating solution including an acrylic resin having silica particles dispersed therein used in Embodiment 1 was bar coated on one surface of polarizer substrate 10. The acrylic resin was cured by irradiating the coating with ultraviolet light to form undercoat layer 20.

Next, polarizer substrate 10 having undercoat layer 20 deposited thereon was placed in a vacuum chamber. An $MgF_2$ layer of λ/4 (λ=520 nm) was deposited by vacuum evaporation at a substrate temperature of 50° C. to form anti-reflection layer 30. The resulting plate was washed with an alkali, rinsed with pure water and fully dried.

The resulting plate was dipped in 1% by weight Florinate FC-40 solution of 2-(perfluorooctyl)-ethyltriaminosilane (the fluorine-containing silane compound) at 20° C. for 5 minutes. The plate was removed from the solution at a speed of 10 cm/sec., and allowed to stand in an atmosphere at a relative humidity of 50% and a temperature of 50° C. for 10 minutes. The resulting polarizer plate was washed with Florinate FC-40 to remove any fluorine-containing silane compound which failed to undergo the reaction to thereby leave anti-staining layer 40. The polarizer plate did not undergo any specific change in its appearance or anti-reflection properties by the deposition of anti-staining layer 40.

The properties of the thus produced polarizer plate 100(3) were evaluated by repeating the procedures of Embodiment 1. Polarizer plate 100(3) exhibited good results comparable to those of polarizer plate 100 of Embodiment 1 in a) adhesion, b) scuff resistance, c) chemical resistance, and d) anti-staining properties.

A liquid crystal display panel was also prepared by adhering polarizer plate 100(3) on the front surface of a simple matrix drive liquid crystal panel. The thus produced liquid crystal display panel was subjected to a) a high-humidity, high-temperature test, b) a thermal shock test, c) a daylight exposure test, and d) a visibility test by repeating the procedures of Embodiment 1. The liquid crystal display panel exhibited good results comparable to those of Embodiment 1 except for the visibility test wherein the display exhibited some glare and reflected images and was acceptable overall. A sample having a reflection plate disposed on the back of the liquid crystal display panel was used in the visibility test.

EMBODIMENT 4 AND EXAMPLE 4

The polarizer plate of this embodiment and example ("plate 100(4)") has a structure basically the same as that of Embodiment 1. Therefore, the description thereof will be made by referring to FIG. 1.

Polarizer plate 100(4) is formed with a polarizer substrate 10 having deposited thereon an undercoat layer 20, an anti-reflection layer 30, and an anti-staining layer 40 in this order. Polarizer substrate 10 is substantially the same as the one used in Embodiment 1, and no further description will be made.

Undercoat layer 20 is a film of an acrylic resin having a thickness of from 0.5 to 20 μm (15 μm in the case of the sample used for the evaluations described below (Example 4)). In contrast to Embodiment 1, undercoat layer 20 does not have silica dispersed therein. Instead, undercoat layer 20 is formed with minute surface irregularities by a transfer method as described below to provide the layer with anti-glare properties.

Undercoat layer 20 of this embodiment had a surface hardness in terms of pencil hardness of 3H, glossiness at 60°, Gs (60°) of 90, a center line average coarseness, Ra of 100 nm, and a haze of 3%.

Anti-reflection layer 30 has a thickness of from 0.05 to 1 μm (0.3 μm in the sample). Anti-reflection layer 30 has a five layer structure of, from the side of undercoat layer 20, an $SiO_2$ layer of λ/4; a laminate of $ZrO_2$ and $SiO_2$ layers of λ/4; a $ZrO_2$ layer of λ/4; and an outermost $SiO_2$ layer of λ/4 (provided that λ is 520 nm).

Anti-staining layer 40 is formed of a layer of 1H,1H,2H,2H-perfluorooctyltriethoxysilane having a thickness of from 20 to 800 Å (up to 100 Å in the sample). Anti-staining layer 40 had a contact angle with water of at least 100° to exhibit an excellent water repellency. Anti-staining layer 40 also had a refractive index, n of from 1.25 to 1.45, and accordingly, the nd (d: thickness of anti-staining layer 40) was confirmed to be smaller than 0.1 μm.

Polarizer plate 100(4) was produced as described below. The acrylic resin coating solution used in Embodiment 1 but without silica particles dispersed therein was roll coated on one surface of polarizer substrate 10, and the coating was dried. A roll having minute irregularities on its surface was pressed and rolled against the dried coating surface to transfer the minute surface irregularities of the roll onto the surface of the coating. The acrylic resin was then cured by irradiating with ultraviolet light to form undercoat layer 20.

Next, polarizer substrate 10 having undercoat layer 20 deposited thereon was placed in a vacuum chamber, and an $SiO_2$ layer of λ/4; a laminate of $ZrO_2$ and $SiO_2$ layers of λ/4; a $ZrO_2$ layer of λ/4; and an $SiO_2$ layer of λ/4 (λ=520 nm) were deposited by vacuum evaporation in this order, for example, by electron beam heating, at a substrate temperature of 50° C. to form anti-reflection layer 30. The resulting plate was washed with methanol and fully dried.

The resulting plate was exposed to a plasma generated by an RF discharge at an oxygen partial pressure of 1 to 0.001 Torr and an outer input of from 50 to 500 W. 3% by weight fluorosolvent, Florinate FC-70 (manufactured by Sumitomo 3M) solution of the fluorine-containing silane compound, 1H,1H,2H,2H-perfluorooctyltriethoxysilane was dropped onto the polarizer plate, placed on the spinner, and rotated at a rotation speed of about 3,000 rpm to spin coat the polarizer plate with the solution of the fluorine-containing silane compound.

The thus coated polarizer plate was left in an atmosphere of a relative humidity of 50% and a temperature or 50° C. for 10 minutes, and then washed with Florinate FC-70 to remove the fluorine-containing silane compound that failed to undergo the reaction to thereby leave anti-staining layer 40 on antireflection layer 30. The polarizer plate did not undergo any significant change in its appearance or anti-reflection properties by the deposition of anti-staining layer 40.

The thus produced polarizer plate 100(4) was evaluated for its properties by repeating the procedure of Embodiment 1. Polarizer plate 100(4) exhibited good results comparable to those of polarizer plate 100 of Embodiment 1 in a) adhesion, b) scuff resistance, c) chemical resistance, and d) anti-staining properties.

A liquid crystal display panel was also prepared by adhering polarizer plate 100(4) on the front surface of an active matrix drive liquid crystal panel utilizing MIM elements. The thus produced liquid crystal display panel was subjected to a) a high-humidity, high-temperature test, b) a thermal shock test, c) a daylight exposure test, and d) a visibility test by repeating the procedure of Embodiment 1. The liquid crystal display panel exhibited good results comparable to those of Embodiment 1 except for the visibility test wherein the display exhibited some reflected images and was acceptable overall.

EMBODIMENT 5 AND EXAMPLE 5

The polarizer plate of this example and those of Embodiments 6 to 8 as will be described below are characterized in that their anti-staining layer 40 is deposited by vacuum evaporation utilizing a ceramic tablet impregnated with the fluorine-containing compound.

The polarizer plate of Embodiment 5 has a structure basically the same as that of Embodiment 1, and therefore, description is made by referring to polarizer plate 100 of FIG. 1 as polarizer plate 100(5).

Polarizer plate 100(5) has a structure including a polarizer substrate 10 having deposited thereon undercoat layer 20, anti-reflection layer 30, and anti-staining layer 40 in this order. Polarizer substrate 10 is substantially the same as the one used in Embodiment 1, and no further description is made.

Undercoat layer 20 is a film having a thickness of from 0.5 to 20 μm (3 μm in the case of the sample used for the evaluation as described below (Example 5)). Undercoat layer 20 is formed of a film of an acrylic resin having silica dispersed therein for providing the film with anti-glare properties. The silica particles have an average particle size of from 0.1 to 5 μm (1 μm in the sample).

The undercoat layer 20 of this example had a surface hardness in terms of pencil hardness of 3H, a glossiness at 60°, Gs (60°) of 35, a center line average coarseness, Ra of 180 nm, and a haze of 13%.

Anti-reflection layer 30 has a thickness of from 0.05 to 1 μm (0.3 μm in the sample) and a five layer structure of, from the side of undercoat layer 20, an $SiO_2$ layer of $\lambda/4$; a laminate of $ZrO_2$ and $SiO_2$ layers of $\lambda/4$; a $ZrO_2$ layer of $\lambda/4$; and an outermost $SiO_2$ layer of $\lambda/4$ (provided that $\lambda$ is 520 nm).

Anti-staining layer 40 includes a layer of perfluorohexadecyltriaminosilane having a thickness of from 20 to 800 Å (200 Å in this example). Anti-staining layer 40 had a contact angle with water of at least 100° to exhibit an excellent water repellency. Anti-staining layer 40 also had a refractive index, n of from 1.25 to 1.45, and accordingly, the nd (d: thickness of anti-staining layer 40) was confirmed to be smaller than 0.1 μm.

Next, the method for producing polarizer plate 100(5) of this example is described.

The coating solution comprising an acrylic resin having silica particles dispersed therein as used in Embodiment 1 was roll coated on one surface of polarizer substrate 10, and the acrylic resin was cured by irradiating with ultraviolet light to form undercoat layer 20.

Next, polarizer substrate 10 having undercoat layer 20 deposited thereon was placed in a vacuum chamber and anti-reflection layer 30 and anti-staining layer 40 were serially deposited on undercoat layer 20 by vacuum evaporation with electron beam heating at a substrate temperature of 50° C.

An embodiment of an apparatus and procedure used for depositing material by vacuum evaporation of materials used in accordance with embodiments of the invention is described in further detail with reference to FIG. 3 as follows.

Figure 3:
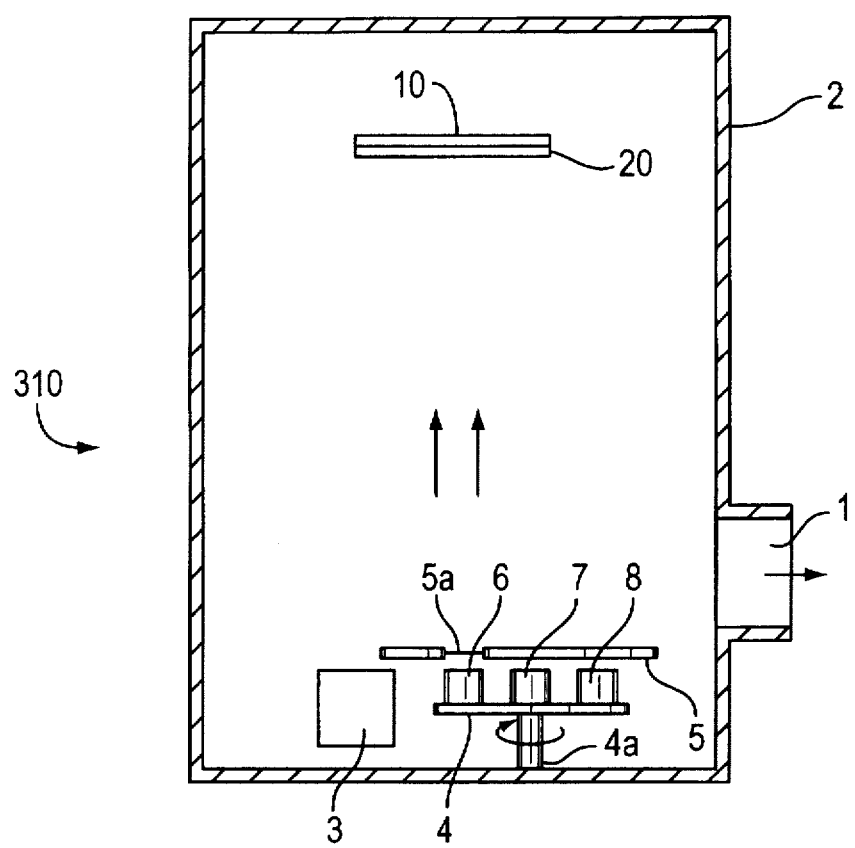
FIG. 3 is a schematic view of a vacuum evaporation apparatus in accordance with an embodiment of the present invention used for the production of a polarizer plate of the present invention.

FIG. 3 is a schematic cross-sectional view of a vacuum evaporation apparatus 310 that may be used for depositing layers of material for this example. Vacuum evaporation apparatus 310 is constructed with a vacuum chamber 2 having an evacuation port 1. vacuum chamber 2 is also provided with a rotary disk 4. One or more tablets 6, 7 and 8 which comprise or contain the material to be deposited by vacuum evaporation are placed on the periphery of rotary disk 4. Rotary disk 4 is secured to a shaft 4a, which is connected to a rotation device (not shown). Rotary disk 4 can be intermittently rotated by the rotation device at a predetermined rotation speed.

In this example, tablet 6 of silicon dioxide and tablet 7 of zirconium oxide are used for forming anti-reflection layer 30. Tablet 8 containing the fluorine-containing silane compound is used for forming anti-staining layer 40.

Tablet 8 for forming anti-staining layer 40 is produced, for example, by (a) mixing 70% by weight of $SiO_2$ and 30% by weight of $Al_2O_3$, and sintering the mixture to produce a porous tablet; (b) placing the tablet in a sealed container and evacuating the sealed container to a vacuum of $10^{-3}$ Torr with a rotary pump, the tablet being heated to 100° C.; (c) cooling the tablet; and (d) introducing perfluorohexadecyltriaminosilane into the sealed container and restoring the pressure to atmospheric pressure to thereby impregnate tablet 8 with the fluorine-containing silane compound.

A shield member 5 is provided beyond rotary disk 4, to cover at least tablets 6, 7 and 8. Shield member 5 includes a shutter 5a which is selectively opened and shut under control. The film thickness of the layer deposited is regulated by controlling the period of time shutter 5a remains open. An electron beam gun 3 is provided near rotary disk 4 to irradiate a single tablet (evaporation source) with the electron beam at a time.

Polarizer substrate 10, having undercoat layer 20 deposited thereon is placed on the other side of vacuum chamber 2, with undercoat layer 20 facing the tablet acting as the evaporation source.

Anti-reflection layer 30 is formed in vacuum evaporation apparatus 310 by evacuating the air in vacuum chamber 2 from evacuation port 1 with an evacuation device (not shown) to a vacuum of up to $10^{-5}$ Torr, and alternately then irradiating tablets 6 and 7 with an electron beam to thereby deposit anti-reflection layer 30 in the form of an $SiO_2$ layer of $\lambda/4$; a laminate of $ZrO_2$ and $SiO_2$ layers of $\lambda/4$, a $ZrO_2$ layer of $\lambda/4$; and an $SiO_2$ layer of $\lambda/4$ in this order.

Next, tablet 8 is irradiated with the electron beam with the vacuum conditions of vacuum chamber 2 retained to heat tablet 8 to a temperature lower than the evaporation temperature of the ceramic support of tablet 8, but high enough to selectively evaporate the fluorine-containing silane compound impregnated in tablet 8 for a predetermined period (approximately 20 seconds) to thereby form anti-staining layer 40.

In the production of polarizer plate 100(5), the plate did not undergo any specific change in its appearance or anti-reflection properties by the deposition of anti-staining layer 40. The method as described above is capable of forming anti-reflection layer 30 and anti-staining layer 40 in the same vacuum chamber.

The resulting polarizer plate 100(5) was evaluated for its properties by repeating the procedures of Embodiment 1.

Polarizer plate 100(5) exhibited good results comparable to those of polarizer plate 100 of Embodiment 1 in a) adhesion, b) scuff resistance, c) chemical resistance, and d) anti-staining properties.

A liquid crystal display panel was also prepared by adhering polarizer plate 100(5) on the front surface of an active matrix drive liquid crystal panel utilizing MIM elements. The thus produced liquid crystal display panel was subjected to a) a high-humidity, high-temperature test, b) a thermal shock test, c) a daylight exposure test, and d) a visibility test by repeating the procedures of Embodiment 1. The liquid crystal display panel exhibited good results comparable to those of Embodiment 1.

EMBODIMENT 6 AND EXAMPLE 6

The polarizer plate of this example has a structure basically the same as that of Embodiment 2, and therefore, description is made by referring to FIG. 2 and polarizer plate 200(6).

Polarizer plate 200(6) has a structure including polarizer substrate 10, resin film 50 disposed on substrate 10 with intervening adhesive layer 52, undercoat layer 20 on resin film 50, anti-reflection layer 30 on undercoat 20, and anti-staining layer 40 on anti-reflection layer 30. Polarizer substrate 10 is substantially the same as the one used in Embodiment 1, and no further description is made.

Resin film 50 is an acrylic resin film having a thickness of 0.03 to 1 mm (0.2 mm in the case of the sample used for the evaluation as described below). Undercoat layer 20 is a film having a thickness of from 0.5 to 20 µm (5 µm in the case of the sample used for the evaluation as described below). Undercoat layer 20 is formed of a film of an acrylic resin, and has no silica dispersed therein for improving the anti-glare properties.

Instead, undercoat layer 20 is provided with antiglare properties by the air spraying method as described below. Undercoat layer 20 of this embodiment (example) had a surface hardness in terms of pencil hardness of 5H, glossiness at 60°, Gs (60°) of 48, a center line average coarseness, Ra of 100 nm, and a haze of 10%.

Anti-reflection layer 30 has a thickness of from 0.05 to 1 µm (0.3 µm in the sample evaluated (Example 6)) and a three layer structure including, from the side of the undercoat layer 20, an $SiO_2$ layer of $\lambda/4$, a $TiO_2$ layers of $\lambda/2$, and an outermost $SiO_2$ layer of $\lambda/4$ (provided that $\lambda$ is 520 nm).

Anti-staining layer 40 is formed of a layer of 3,3,3-trifluoropropyltrichlorosilane having a thickness of from 20 to 800 Å (up to 100 Å in the sample). Anti-staining layer 40 had a contact angle with water of at least 100° and exhibited excellent water repellency. Anti-staining layer 40 also had a refractive index, n of from 1.25 to 1.45, and accordingly, the nd (d: thickness of anti-staining layer 40) was confirmed to be smaller than 0.1 µm.

Polarizer plate 200(6) of this example was prepared as follows. First, undercoat layer 20 was formed on one surface of resin film 50 by applying an acrylic resin coating solution by air spraying. The amount of the coating solution and the air injected were controlled such that the spray droplets would have an average particle size of from 5 to 100 µm. The shift speed of the resin film was also suitably controlled.

Next, resin film 50 having undercoat layer 20 deposited thereon was placed in a vacuum chamber, and an $SiO_2$ layer of $\lambda/4$, a $TiO_2$ layer of $\lambda/2$, and an $SiO_2$ layer of $\lambda/4$ ($\lambda$=520 nm) were deposited in this order by vacuum evaporation, with electron beam heating, at a substrate temperature of 50° C. to form anti-reflection layer 30.

The resulting product was placed in a vacuum chamber, and anti-staining layer 40 was formed on anti-reflection layer 30 by means of vacuum evaporation, with resistance heating. The tablet placed in the vacuum evaporation apparatus was prepared by repeating the procedure of Embodiment 5, by impregnating a porous alumina tablet with 3,3,3-trifluoropropyltrichlorosilane. The vacuum chamber was evacuated to a vacuum of $10^{-6}$ Torr, and the substrate being subjected to vacuum evaporation was exposed to oxygen plasma. The tablet described above was then heated to about 200° C. with electric resistance heating to evaporate the fluorine-containing silane compound (3,3,3-trifluoropropyltrichlorosilane) from the tablet for 30 seconds to thereby form anti-staining layer 40. Anti-reflective layer 30 did not undergo any specific change in its appearance or anti-reflection properties by the deposition of anti-staining layer 40.

The resulting resin film laminate was adhered to polarizer substrate 10 with an acrylic adhesive by repeating the procedure of Embodiment 2 to produce polarizer plate 200(6) of this example.

The properties of polarizer plate 200(6) were evaluated by is repeating the procedures of Embodiment 1. Polarizer.plate 200(6) exhibited good results comparable to those of polarizer plate 100 of Embodiment 1 in a) adhesion, b) scuff resistance, c) chemical resistance, and d) anti-staining properties, except for some difficulty in the removal of the dirt attached on its surface by rubbing and was acceptable overall.

A liquid crystal display panel was also prepared by adhering polarizer plate 200(6) on the front surface of an active matrix drive liquid crystal panel utilizing a TFT element. The thus produced liquid crystal display panel was subjected to a) a high-humidity, high-temperature test, b) a thermal shock test, c) a daylight exposure test, and d) a visibility test by repeating the procedures of Embodiment 1. The liquid crystal display panel exhibited good results, comparable to those of Embodiment 1 except for some glitter and was acceptable overall.

EMBODIMENT 7 AND EXAMPLE 7

The polarizer plate of this example has a structure basically the same as that of Embodiment 1, and therefore, description is made by referring to FIG. 1 (and polarizer plate 100(7).

Polarizer plate 100(7) has a structure made up of polarizer substrate 10 having deposited thereon undercoat layer 20, anti-reflection layer 30, and anti-staining layer 40 in this order. Polarizer substrate 10 has substantially the same construction as that of Embodiment 1, and no further description is made.

Undercoat layer 20 is a film having a thickness of from 0.5 to 20 µm (3 µm in the case of the sample used for the evaluation described below (Example 7)). Undercoat layer 20 is formed of a film of an acrylic resin having silica dispersed therein for providing anti-glare properties. The silica dispersed has an average particle size of from 0.1 to 5 µm (2 µm in the sample). Undercoat layer 20 of this example had a surface hardness in terms of pencil hardness of 3H, glossiness at 60°, Gs (60°) of 26, a center line average coarseness, Ra of 220 nm, and a haze of 20%. Anti-reflection layer 30 has a thickness of from 0.05 to 1 µm (0.1 µm in the sample) and a monolayer structure of an $MgF_2$ layer of $\lambda/4$ (provided that $\lambda$ is 520 nm).

Anti-staining layer 40 was formed of a layer of bis (perfluorononyl)butylaminosilane having a thickness of from 20 to 800 Å (400 Å in the sample). Anti-staining layer 40 had a contact angle with water of at least 100° and exhibited excellent water repellency. Anti-staining layer 40 also had a refractive index, n of from 1.25 to 1.45, and accordingly, the nd (d: thickness of anti-staining layer 40) was confirmed to be smaller than 0.1 μm.

Polarizer plate 100(7) of this example was produced as follows. The coating solution including an acrylic resin having silica particles dispersed therein used in Embodiment 1 was roll coated on one surface of polarizer substrate 10, and the acrylic resin was cured by irradiating with ultraviolet light to form undercoat layer 20.

Next, polarizer substrate 10 having the undercoat layer 20 deposited thereon was placed in a vacuum chamber, and an $MgF_2$ layer of $\lambda/4$ ($\lambda=520$ nm) was deposited by vacuum evaporation with electron beam heating at a substrate temperature of 50° C. to form anti-reflection layer 30 on undercoat layer 20.

To deposit anti-stain layer 40 on layer 30, first, a porous silica nitride tablet was impregnated with bis(perfluorononyl)butylaminosilane by the same method as that of Embodiment 5. The resulting tablet was placed in a vacuum chamber wherein the tablet could be heated with a lamp. The polarizer substrate having undercoat layer 20 and anti-reflection layer 30 deposited thereon was placed in the vacuum chamber, and the vacuum chamber was evacuated to a vacuum of $10^{-6}$ Torr. The polarizer substrate was exposed to oxygen plasma and then the tablet was heated for about 30 seconds with the radiation heat of the lamp to form anti-staining layer 40 on anti-reflection layer 30.

The properties of the resulting polarizer plate 100(7) were evaluated by repeating the procedures of Embodiment 1. Polarizer plate 100(7) exhibited good results comparable to those of the polarizer plate 100 of Embodiment 1 in a) adhesion, b) scuff resistance, c) chemical resistance, and d) anti-staining properties.

A liquid crystal display panel was also prepared by adhering polarizer plate 100(7) on the front surface of a simple matrix drive liquid crystal panel. The thus produced liquid crystal display panel was subjected to a) a high-humidity, high-temperature test, b) a thermal shock test, c) a daylight exposure test, and d) a visibility test by repeating the procedures of Embodiment 1. A sample having a reflection plate disposed on the back of the liquid crystal display panel was used in the visibility test. The liquid crystal display panel exhibited good results comparable to those of Embodiment 1.

EMBODIMENT 8 AND EXAMPLE 8

The polarizer plate of this embodiment has a structure basically the same as that of Embodiment 1, and therefore, the description thereof is made by referring to FIG. 1 and polarizer plate 100(8).

Polarizer plate 100(8) includes polarizer substrate 10 having undercoat layer 20 deposited thereon, anti-reflection layer 30 thereon, and anti-staining layer 40 thereon in this order. Polarizer substrate 10 is substantially the same as that of Embodiment 1, and no further description is made.

Undercoat layer 20 is a film of an acrylic resin having a thickness of from 0.5 to 20 μm (4 μm in the case of the sample used for the evaluation described below (Example 8)). In contrast to Embodiment 1, undercoat layer 20 of this embodiment does not have silica dispersed therein. Instead, undercoat layer 20 is formed with minute surface irregularities by the transfer method to provide antiglare properties of the layer.

Undercoat layer 20 of this example had a surface hardness in terms of pencil hardness of 3H, glossiness at 60°, Gs (60°) of 90, a center line average coarseness, Ra of 100 nm, and a haze of 3%.

Anti-reflection layer 30 has a thickness of from 0.05 to 1 μm (0.3 μm in the sample) and a five layer structure of, from the side of undercoat layer 20, an $SiO_2$ layer of $\lambda/4$; a laminate of $ZrO_2$ and $SiO_2$ layers of $\lambda/4$; a $Zro_2$ layer of $\lambda/4$; and an outermost $SiO_2$ layer of $\lambda/4$ (provided that $\lambda$ is 520 nm).

Anti-staining layer 40 is formed of a layer of 1H,1H,2H,2H-perfluorooctyltribromosilane having a thickness of from 20 to 800 Å (300 Å in the sample evaluated). Anti-staining layer 40 had a contact angle with water of at least 100° and exhibited excellent water repellency. Anti-staining layer 40 also had a refractive index, n of from 1.25 to 1.45, and accordingly, the nd (d: thickness of anti-staining layer 40) was confirmed to be smaller than 0.1 μm.

Polarizer plate 100(8) of this example was produced as follows. The acrylic resin coating solution used in Embodiment 4 was applied onto one surface of polarizer substrate 10, and minute surface irregularities were formed on the surface of the coating by repeating the transfer procedure of Embodiment 4 to thereby complete undercoat layer 20.

Next, anti-reflection layer 30 and anti-staining layer 40 were continuously formed on undercoat layer 20 by using the vacuum evaporation apparatus used in Embodiment 5. The fluorine-containing silane compound used was 1H,1H,2H,2H-perfluorooctyltribromosilane which had been impregnated in a porous alumina tablet by repeating the procedure of Embodiment 5. Polarizer substrate 10 having undercoat layer 20 deposited thereon was placed in a vacuum chamber, and an $SiO_2$ layer of $\lambda/4$; a laminate of $ZrO_2$ and $SiO_2$ layers of $\lambda/4$; a $ZrO_2$ layer of $\lambda/4$; and an $SiO_2$ layer of $\lambda/4$ ($\lambda=520$ nm) were deposited in this order by vacuum evaporation at a substrate temperature of 50° C. to form anti-reflection layer 30.

Next, a tablet having the fluorine-containing silane compound impregnated therein was irradiated with an electron beam to selectively evaporate the fluorine-containing silane compound for a predetermined period of time (20 minutes), with the vacuum of the vacuum chamber retained, to thereby form anti-staining layer 40. The polarizer plate did not undergo any specific change in its appearance or anti-reflection properties by the deposition of anti-staining layer 40.

The properties of the thus produced polarizer plate 100(8) were evaluated by repeating the procedures of Embodiment 1. Polarizer plate 100(8) exhibited good results, comparable to those of polarizer plate 100 of Embodiment 1 in a) adhesion, b) scuff resistance, c) chemical resistance, and d) anti-staining properties.

A liquid crystal display panel was also prepared by adhering polarizer plate 100(8) on the front surface of an active matrix drive liquid crystal panel utilizing MIM elements. The thus produced liquid crystal display panel was subjected to a) a high-humidity, high-temperature test, b) a thermal shock test, c) a daylight exposure test, and d) a visibility test by repeating the procedures of Embodiment 1. The liquid crystal display panel exhibited good results compared to those of Embodiment 1 except for the visibility test, wherein the display exhibited some reflected images, and was acceptable overall.

EMBODIMENT 9 AND EXAMPLE 9

The polarizer plate of this embodiment has a structure basically the same as that of Embodiment 1, and therefore, the description thereof is made by referring to FIG. 1 and polarizer plate 100(9). This Embodiment and Embodiments 10 to 12, described below, are characterized by the use of an amine compound for the fluorine-containing silane compound of anti-staining layer 40, and anti-staining layer 40 is formed by dipping as in the case of Embodiment 3.

Polarizer plate 100(9) includes polarizer substrate 10 having deposited thereon undercoat layer 20, an anti-reflection layer 30 on layer 20, and anti-staining layer 40 on layer 30, in this order. Polarizer substrate 10 is substantially the same as the one used in Embodiment 1, and no further description is made.

Undercoat layer 20 is a film having a thickness of from 0.5 to 20 µm (3 µm in the case of the sample used for the evaluation described below (Example 9)) and is formed as a film of an acrylic resin having silica particles dispersed therein for providing antiglare properties of the film. The silica particles dispersed have an average particle size of from 0.1 to 5 µm (2 µm in the sample evaluated). Undercoat layer 20 of this example had a surface hardness in terms of pencil hardness of 3H, glossiness at 60°, Gs (60°) of 18, a center line average coarseness, Ra of 310 nm, and a haze of 32%.

Anti-reflection layer 30 has a thickness of from 0.05 to 1 µm (0.3 µm in the example) and a five layer structure including, from the side of undercoat layer 20, an $SiO_2$ layer of $\lambda/4$; a laminate of $ZrO_2$ and $SiO_2$ layers of $\lambda/4$; a $ZrO_2$ layer of $\lambda/4$; and an outermost $SiO_2$ layer of $\lambda/4$ (provided that $\lambda$ is 520 nm).

Anti-staining layer 40 is in the form of a layer of 1H,1H, 2H,2H-perfluorodecyltriaminosilane having a thickness of from 20 to 800 Å (up to 100 Å in the sample). Anti-staining layer 40 had a contact angle with water of at least 100° and exhibited excellent water repellency. Anti-staining layer 40 also had a refractive index, n of from 1.25 to 1.45, and accordingly, the nd (d: thickness of anti-staining layer 40) was confirmed to be smaller than 0.1 µm.

Polarizer plate 100(9) of this example was produced as described below. The coating solution including an acrylic resin having silica particles dispersed therein used in Embodiment 1 was roll coated on one surface of polarizer substrate 10, and the acrylic resin was cured by irradiating with ultraviolet light to form undercoat layer 20.

Next, resin film 10 having undercoat layer 20 deposited thereon was placed in a vacuum chamber, and an $SiO_2$ layer of $\lambda/4$; a laminate of $ZrO_2$ and $SiO_2$ layers of $\lambda/4$; a $ZrO_2$ layer of $\lambda/4$; and an $SiO_2$ layer of $\lambda/4$ ($\lambda$=520 nm) were deposited in this order by vacuum evaporation with electron beam heating at a substrate temperature of 50° C. to form anti-reflection layer 30. The resulting plate was washed with methanol and fully dried.

Next, the resulting polarizer plate was dipped in 1% by weight 1,1,2-trichloro-1,2,2-trifluoroethane solution of 1H,1H,2H,2H-perfluorodecyltriaminosilane (the fluorine-containing silane compound) at 20° C. for 1 minute. The polarizer plate was removed from the solution at a speed of 10 cm/sec., and allowed to stand in an atmosphere at a relative humidity of 50% and a temperature of 60° C. for 10 minutes. At this stage, the plate had a relatively thick, somewhat inconsistent coating layer of about 10 µm thick on both surfaces, and the surfaces had a clouded appearance.

The polarizer plate was then dipped in 1,1,2-trichloro-1, 2,2-trifluoroethane for 1 minute to wash the plate and remove the fluorine-containing silane compound which failed to undergo the cure reaction, and to thereby leave the anti-staining layer 40 in anti-reflection layer 30.

The fluorine-containing silane compound does not react with the triacetyl cellulose (TAC) that constitutes supporting layers 14 and 16 of polarizer substrate 10. Therefore, the fluorine-containing silane compound on second supporting layer 16 that has not undergone any reaction with layer 16 can be removed by washing the plate with the fluorosolvent. After the washing, the layer of the fluorine-containing silane compound that had formed on second supporting layer 16 during the dipping of the plate is no longer present on second supporting layer 16. The polarizer plate did not undergo any specific change in its appearance or anti-reflection properties by the deposition of anti-staining layer 40.

The properties of the thus produced polarizer plate 100(9) were evaluated by repeating the procedures of Embodiment 1. Polarizer plate 100(9) exhibited good results comparable to those of the polarizer plate 100 of Embodiment 1 in a) adhesion, b) scuff resistance, c) chemical resistance, and d) anti-staining properties except for some difficulty in the removal of dirt on its surface by rubbing. In addition, the polarizer plate could restore its initial state by cleaning with a neutral detergent.

A liquid crystal display panel was also prepared by adhering polarizer plate 100(9) on the front surface of an active matrix drive liquid crystal panel utilizing MIM elements. The thus produced liquid crystal display panel was subjected to a) a high-humidity, high-temperature test, b) a thermal shock test, c) a daylight exposure test, and d) a visibility test by repeating the procedures of Embodiment 1. The liquid crystal display panel exhibited good results compared to those of the panel of Embodiment 1.

EMBODIMENT 10 AND EXAMPLE 10

The polarizer plate of this embodiment and example has a structure basically the same as that of plate 100 of Embodiment 1, and therefore, description is made by referring to FIG. 1 and polarizer plate 100(10).

Polarizer plate 100(10) is constructed with polarizer substrate 10 having undercoat layer 20 deposited thereon, anti-reflection layer 30 on layer 20, and anti-staining layer 40 on layer 30, in this order. Polarizer substrate 10 is substantially the same as the one used in Embodiment 1, and no further description is made.

Undercoat layer 20 is a film of an acrylic resin having a thickness of from 0.5 to 20 µm (3 µm in the case of the sample used for the evaluation as described below (Example 10)). Undercoat layer 20 does not have any silica particles dispersed therein for the purpose of providing antiglare properties of the layer.

Undercoat layer 20 of this example had a surface hardness in terms of pencil hardness of 3H, glossiness at 60°, Gs (60°) of 90, a center line average coarseness, Ra of 50 nm, and a haze of 0.5%.

Anti-reflection layer 30 has a thickness of from 0.05 to 1 µm (0.1 µm in the sample). Anti-reflection layer 30 has a monolayer structure of an $MgF_2$ layer of $\lambda/4$ (provided that $\lambda$ is 520 nm).

Anti-staining layer 40 is formed of a layer of bis(1H,1H-perfluorononyl)butylaminosilane having a thickness of from 20 to 800 Å (up to 100 Å in the sample (example) used for the evaluations described below). Anti-staining layer 40 had a contact angle with water of at least 100° to exhibit an excellent water repellency. Anti-staining layer 40 also had a refractive index, n of from 1.25 to 1.45, and accordingly, the nd (d: thickness of anti-staining layer 40) was confirmed to be smaller than 0.1 µm.

Polarizer plate 100(10) of this example was produced as described below. The acrylic resin coating solution used in Embodiment 4 and having no silica particles dispersed therein was roll coated on one surface of polarizer substrate 10. The acrylic resin was then cured by irradiating with ultraviolet light to form undercoat layer 20.

Next, polarizer substrate 10 having undercoat layer 20 deposited thereon was placed in a vacuum chamber, and an MgF$_2$ layer of λ/4 (λ=520 nm) was deposited by vacuum evaporation, with electron beam heating at a substrate temperature of 50° C. to form anti-reflection layer 30 on layer 20.

The resulting plate was washed with an alkali solution, rinsed with pure water, fully dried, then dipped in 5% by weight Florinate FC-40 solution of bis(1H,1H-perfluorononyl)butylaminosilane (the fluorine-containing silane compound) at 20° C. for 5 minutes. The plate was removed from the solution at a speed of 10 cm/sec., and allowed to stand in an atmosphere at a relative humidity of 50% and a temperature of 50° C. for 1 hour. At this stage, the plate had a relatively thick, somewhat inconsistent coating layer of about 10 μm thick on both surfaces, and the surfaces had a clouded appearance.

The fluorine-containing silane compound does not react with the triacetyl cellulose (TAC) that constitutes supporting layers 14 and 16 of polarizer substrate 10. Therefore, the fluorine-containing silane compound on the second supporting layer 16 that has not undergone any reaction with the layer 16 can be removed by washing the plate with a fluorosolvent. Therefore, the polarizer plate was dipped in Florinate FC-40 for 1 minute to wash the plate and remove the fluorine-containing silane compound which failed to undergo the reaction, and to thereby leave anti-staining layer 40. After the washing step, the layer of the fluorine-containing silane compound that had formed on second supporting layer 16 during the dipping step is no longer present on second supporting layer 16. The polarizer plate did not undergo any specific change in its appearance or anti-reflection properties by the deposition of the anti-staining layer 40.

The properties of polarizer plate 100(10) were evaluated by repeating the procedures of Embodiment 1. Polarizer plate 100(10) exhibited good results comparable to those of polarizer plate 100 of Embodiment 1 in a) adhesion, b) scuff resistance, c) chemical resistance, and d) anti-staining properties.

A liquid crystal display panel was also prepared by adhering polarizer plate 100(10) on the front surface of an simple matrix drive liquid crystal panel. The thus produced liquid crystal display panel was subjected to a) a high-humidity, high-temperature test, b) a thermal shock test, c) a daylight exposure test, and d) a visibility test by repeating the testing procedures of Embodiment 1. A sample having a reflection plate disposed on the back of the liquid crystal display panel was used in the visibility test. The liquid crystal display panel exhibited good results comparable to those of Embodiment 1 except for the visibility test, wherein the display exhibited significant reflected images, but was as a whole, acceptable.

EMBODIMENT 11 AND EXAMPLE 11

The polarizer plate of this embodiment has a structure basically the same as that of Embodiment 1, and therefore, description is made by referring to FIG. 1 and to polarizer plate 100(11).

Polarizer plate 100(11) has a structure including polarizer substrate 10 having undercoat layer 20 deposited thereon, anti-reflection layer 30 on layer 20, and anti-staining layer 40 on layer 30, in this order. Polarizer substrate 10 is substantially the same as the one used in Embodiment 1, and no further description is made.

Undercoat layer 20 is a film of an acrylic resin having a thickness of from 0.5 to 20 μm (5 μm in the case of the sample used for the evaluations described below (Example 11)).

In contrast to the case of Embodiment 1, undercoat layer 20 of this embodiment does not have silica dispersed therein. Instead, undercoat layer 20 is formed with minute surface irregularities by the transfer method to provide the layer with anti-glare properties.

Undercoat layer 20 of this example had a surface hardness in terms of pencil hardness of 3H, glossiness at 60°, Gs (60°) of 37, a center line average coarseness, Ra of 1000 nm, and a haze of 35%.

Anti-reflection layer 30 has a thickness of from 0.05 to 1 μm (0.3 μm in the sample). Anti-reflection layer 30 has a three layer structure comprising, from the side of the undercoat layer 20, an SiO$_2$ layer of λ/4, a TiO$_2$ layer of λ/2, and an outermost SiO$_2$ layer of λ/4 (provided that λ is 520 nm).

Anti-staining layer 40 is formed of a layer of bis(1H,1H-perfluorobutyl)diaminosilane having a thickness of from 20 to 800 Å (up to 100 Å in the sample evaluated below). Anti-staining layer 40 had a contact angle with water of at least 100° and exhibits excellent water repellency. Anti-staining layer 40 also had a refractive index, n of from 1.25 to 1.45, and accordingly, the nd (d: thickness of anti-staining layer 40) was confirmed to be smaller than 0.1 μm.

Polarizer plate 100(11) of this example was produced as described below. The acrylic resin coating solution used in Embodiment 4 and having no silica particles dispersed therein was roll coated on one surface of polarizer substrate 10, and the coating was dried. The dried film was then patterned with minute surface irregularities by repeating the transfer procedure of Embodiment 4. The acrylic resin was then cured by irradiating with ultraviolet light to form undercoat layer 20.

Next, the polarizer substrate 10 having undercoat layer 20 deposited thereon was placed in a vacuum chamber, and an SiO$_2$ layer of λ/4, a TiO$_2$ layer of λ/2, and an outermost SiO$_2$ layer of λ/4 (λ is 520 nm) were deposited in this order by vacuum evaporation with electron beam heating at a substrate temperature of 50° C. to form anti-reflection layer 30. The resulting plate was washed with methanol and fully dried.

The resulting plate was dipped in 3% by weight Florinate FC-40 solution of bis(1H,1H-perfluorobutyl)diaminosilane (the fluorine-containing silane compound) at 20° C. for 2 minutes. The plate was removed from the solution at a speed of 5 cm/sec., and allowed to stand in an atmosphere of room temperature for 1 day. The polarizer plate was then dipped in liquid Florinate FC-40 for 1 minute, and after that placed in a vapor bath of Florinate FC-40 to wash the polarizer plate and remove the fluorine-containing silane compound which failed to undergo the reaction, and anti-staining layer 40 was thereby formed.

The fluorine-containing silane compound does not react with the triacetyl cellulose (TAC) that constitutes supporting layers 14 and 16 of polarizer substrate 10. Therefore, the fluorine-containing silane compound on second supporting layer 16 that has not undergone any reaction with layer 16 can be removed by washing the plate with the fluorosolvent. After it is washed, the layer of the fluorine-containing silane compound that had formed on second supporting layer 16 when the plate was dipped is no longer present on second supporting layer 16. The polarizer plate did not undergo any specific change in its appearance or anti-reflection properties by the deposition of the anti-staining layer 40.

The properties of polarizer plate 100(11) were evaluated by repeating the procedures of Embodiment 1. Polarizer plate 100(11) exhibited good results comparable to those of the polarizer plate 100 of Embodiment 1 in a) adhesion, b) scuff resistance, c) chemical resistance, and d) anti-staining properties.

A liquid crystal display panel was also prepared by adhering polarizer plate 100(11) on the front surface of an active matrix drive liquid crystal panel utilizing TFT active elements. The thus produced liquid crystal display panel was subjected to a) a high-humidity, high-temperature test, b) a thermal shock test, c) a daylight exposure test, and d) a visibility test by repeating the procedures of Embodiment 1. The liquid crystal display panel exhibited good results comparable to those of Embodiment 1 except for the visibility test wherein the display exhibited a somewhat reduced resolution, but was overall, acceptable.

EMBODIMENT 12 AND EXAMPLE 12

The polarizer plate of this embodiment and example has a structure basically the same as that of Embodiment 1, and therefore, description is made by referring to FIG. 1 and polarizer plate 100(12).

Polarizer plate 100(12) has a structure including polarizer substrate 10 having deposited thereon undercoat layer 20, an anti-reflection layer 30 on layer 20, and anti-staining layer 40 on layer 30, in this order. Polarizer substrate 10 is substantially the same as the one used in Embodiment 1, and no further description is made.

Undercoat layer 20 is a film having a thickness of from 0.5 to 20 μm (1 μm in the case of the sample (Example 12) used for the evaluation as described below). Undercoat layer 20 is formed of a film of an acrylic resin having silica dispersed therein for providing the film with anti-glare properties. The silica particles dispersed have an average particle size of from 0.1 to 5 μm (0.3 μm in Example 12).

Undercoat layer 20 of Example 12 had a surface hardness in terms of pencil hardness of 5H, glossiness at 60°, Gs (60°) of 35, a center line average coarseness, Ra of 80 nm, and a haze of 7%.

Anti-reflection layer 30 has a thickness of from 0.05 to 1 μm (0.3 μm in Example 12) and a five layer structure including, from the side of undercoat layer 20, an $SiO_2$ layer of $\lambda/4$; a laminate of $ZrO_2$ and $SiO_2$ layers of $\lambda/4$; a $ZrO_2$ layer of $\lambda/4$; and an outermost $SiO_2$ layer of $\lambda/4$ (provided that $\lambda$ is 520 nm).

Anti-staining layer 40 is formed of a layer of 2-(perfluorononyl)-ethylbutyldiaminosilane having a thickness of from 20 to 800 Å (up to 100 Å in Example 12). Anti-staining layer 40 had a contact angle with water of at least 100° to exhibit an excellent water repellency and also exhibited oil repellency. Anti-staining layer 40 also had a refractive index, n of from 1.25 to 1.45, and accordingly, the nd (d: thickness of the anti-staining layer 40) was confirmed to be smaller than 0.1 μm.

Polarizer plate 100(12) of Example 12 was produced as follows. The siloxane resin coating solution used in Embodiment 2, having silica particles dispersed therein, was roll coated onto one surface of polarizer substrate 10. The siloxane resin was then cured by heating to 80° C. to form undercoat layer 20.

Next, polarizer substrate 10 having undercoat layer 20 deposited thereon was placed in a vacuum chamber, and an $SiO_2$ layer of $\lambda/4$; a laminate of $ZrO_2$ and $SiO_2$ layers of $\lambda/4$; a $ZrO_2$ layer of $\lambda/4$; and an outermost $SiO_2$ layer of $\lambda/4$ ($\lambda$ is 520 nm) were deposited in this order by vacuum evaporation, with electron beam heating at a substrate temperature of 50° C. to form anti-reflection layer 30. The resulting plate was washed with methanol, rinsed with pure water, and fully dried.

The resulting plate was dipped in 10% by weight Florinate FC-40 solution of 2-(perfluorononyl)-ethylbutyldiaminosilane (the fluorine-containing silane compound) at 20° C. for 5 minutes. The plate was removed from the solution at a speed of 3 cm/sec., and allowed to stand in an atmosphere at a relative humidity of 50% and a temperature of 40° C. for 1 hour. At this stage, the plate had a relatively thick, somewhat inconsistent coating layer of about 1 μm thick on both surfaces, and a clouded appearance.

This polarizer plate was then dipped in Florinate FC-40 for 1 minute to wash the plate and remove the fluorine-containing silane compound which failed to react with layer 30, to thereby leave anti-staining layer 40 on layer 30.

The fluorine-containing silane compound does not react with the triacetyl cellulose (TAC) of supporting layers 14 and 16 of polarizer substrate 10. Therefore, the fluorine-containing silane compound on second supporting layer 16 can be removed by washing the plate with the fluorosolvent. After washing, the layer of the fluorine-containing silane compound that had formed on second supporting layer 16 during the dipping step is no longer present on second supporting layer 16. The polarizer plate did not undergo any specific change in its appearance or anti-reflection properties by the deposition of anti-staining layer 40.

The properties of the thus produced polarizer plate 100 (12) were evaluated by repeating the procedures of Embodiment 1. Polarizer plate 100(12) exhibited good results comparable to those of polarizer plate 100 of Embodiment 1 in a) adhesion, b) scuff resistance, c) chemical resistance, and d) anti-staining properties, except for some difficulty in the removal by rubbing of the dirt attached on its surface. In addition, the polarizer plate could restore its initial state by cleaning with a neutral detergent.

A liquid crystal display panel was also prepared by adhering polarizer plate 100(12) on the front surface of an active matrix drive liquid crystal panel utilizing MIM elements. The thus produced liquid crystal display panel was subjected to a) a high-humidity, high-temperature test, b) a thermal shock test, c) a daylight exposure test, and d) a visibility test by repeating the procedures of Embodiment 1. The liquid crystal display panel exhibited good results comparable to those of Embodiment 1.

EMBODIMENT 13 AND EXAMPLE 13

Embodiments 13 to 16 and the specific examples described therein are characterized by an anti-reflection layer 30 that is deposited by a coating technique such as dip coating, in contrast to the preceding examples, wherein anti-reflection layer 30 was formed by vapor deposition.

The polarizer plate of this embodiment has a structure basically the same as that of Embodiment 1, and therefore, description is made by referring to FIG. 1 and polarizer plate 100(13).

Polarizer plate 100(13) has a structure comprising a polarizer substrate 10 having undercoat layer 20 thereon, anti-reflection layer 30 on layer 20, and anti-staining layer 40 on layer 30, in this order. Polarizer substrate 10 is substantially the same as the one used in Embodiment 1, and no further description is made.

Undercoat layer 20 is a film having a thickness of from 0.5 to 20 μm (3 μm in the case of the Example 13 used for the evaluations described below). Undercoat layer 20 is formed of a film of an acrylic resin having silica particles dispersed therein for providing the film with anti-glare properties. The silica particles dispersed have an average particle size of from 0.1 to 5 μm (1.2 μm in Example 13).

Undercoat layer 20 of Example 13 had a surface hardness in terms of pencil hardness of 3H, glossiness at 60°, Gs (60°) of 25, a center line average coarseness, Ra of 250 nm, and a haze of 15%.

Anti-reflection layer 30 is formed as a two layer structure with a siloxane resin layer of high refractive index with a thickness of about 850 Å and an acrylic resin layer of low refractive index with a thickness of about 950 Å. Titania particles having an average particle size of about 50 Å and silica particles having an average particle size of about 80 Å are dispersed in the siloxane resin of the layer of high refractive index.

In Example 13, the layer of high refractive index had a refractive index of 1.64, and the layer of low refractive index had a refractive index of 1.42. This anti-reflection layer 30 had a reflectance in air of 0.5% at 550 nm to confirm the high anti-reflection effect of the layer.

Anti-staining layer 40 is formed of a layer of 2-(perfluorooctyl)-ethyltriaminosilane having a thickness of from 20 to 800 Å (200 Å in the Example 13). Anti-staining layer 40 had a contact angle with water of at least 100° to exhibit an excellent water repellency. Anti-staining layer 40 was also resistant to wetting by common organic solvents to demonstrate excellent oil repellency. Anti-staining layer 40 had a refractive index n of from 1.25 to 1.45, and accordingly, the nd (d: thickness of anti-staining layer 40) was confirmed to be smaller than 0.1 μm.

Polarizer plate 100(13) of Example 13 was produced as follows. An acrylic resin coating solution having silica particles dispersed therein was roll coated on one surface of polarizer substrate 10. The acrylic resin was then cured by irradiating with ultraviolet light to form undercoat layer 20.

Next, 50% by weight of γ-glycidoxypropyltrimethoxysilane was dissolved in methylcellosolve, and a catalytic amount (about 0.01% by weight of the coating solution) of hydrochloric acid was added to the solution, and the solution was agitated at room temperature. To the thus prepared solution were added the titania particles and the silica particles as described above, and then, a catalytic amount (about 0.05% by weight of the coating solution) of magnesium perchlorate, and the solution was thoroughly agitated to prepare the coating solution. The resulting solution was a uniform sol, and could be stably stored for a prolonged period with essentially no precipitation. Polarizer substrate 10, having undercoat layer 20 deposited thereon was dipped in the coating solution to form a coating film, and the polarizer plate was heated to a temperature of from 40° to 100° C. (60° C. in Example 13) to form a layer of high refractive index.

Next, 5% by weight of perfluoroalkylacrylate oligomer was dissolved in a fluorosolvent (trifluoromethylbenzene) to prepare the coating solution. A coating layer was formed on the polarizer plate by a dipping method, and the plate was heated to a temperature of from 30° to 100° C. (50° C. in Example 13) for 5 to 180 minutes (30 minutes in Example 13). The plate was then irradiated with ultraviolet light with an intensity of, for example, 1 Joule (Example 13) to form an acrylic resin layer of low refractive index.

The thus formed anti-reflection layer 30, having a two-layer structure was confirmed to be very dense and homogeneous with no cracks. In Example 13, it was also found that the film thickness could be fully controlled in the order of approximately 50 Å.

Next, a porous alumina tablet was impregnated with 2-(perfluorooctyl)-ethyltriaminosilane by repeating the procedure of Embodiment 5, and the resulting tablet was used for the evaporation source to deposit anti-staining layer 40 by vacuum evaporation. The vacuum chamber was evacuated to a vacuum of $10^{-6}$ Torr, and the substrate being subjected to vacuum evaporation was exposed to oxygen plasma. The tablet was heated by electric resistance heating to selectively evaporate the fluorine-containing silane compound from the tablet for a predetermined period (30 seconds in Example 13) to thereby deposit a layer of the fluorine-containing silane compound on anti-reflection layer 30. The plate did not undergo any specific change in its appearance or anti-reflection properties by the deposition of anti-staining layer 40.

The properties of the thus produced polarizer plate 100 (13) of Example 13 were evaluated by repeating the procedures of Embodiment 1. Polarizer plate 100(13) exhibited good results comparable to those of polarizer plate 100 of Embodiment 1 in a) adhesion, b) scuff resistance, c) chemical resistance, and d) anti-staining properties.

A liquid crystal display panel was also prepared by adhering polarizer plate 100(13) of Example 13 to the front of an active matrix drive liquid crystal panel utilizing MIM active elements. The thus produced liquid crystal display panel was subjected to a) a high-humidity, high-temperature test, b) a thermal shock test, c) a daylight exposure test, and d) a visibility test by repeating the procedures of Embodiment 1. The liquid crystal display panel exhibited good results comparable to those of Embodiment 1.

EMBODIMENT 14 AND EXAMPLE 14

The polarizer plate of Embodiment 14 and Example 14 has a structure basically the same as that of Embodiment 2, and therefore, description is made by referring to FIG. 2 and polarizer plate 200(14).

Polarizer plate 200(14) has a structure including polarizer substrate 10, resin film 50 disposed on substrate 10 with intervening adhesive layer 52 therebetween. Undercoat layer 20 is disposed on layer 50, anti-reflection layer 30 is on layer 20, and anti-staining layer 40 is on layer 30. Polarizer substrate 10 is substantially the same as that used in Embodiment 1, and no further description is made.

Resin film 50 is an acrylic resin film having a thickness of 0.03 to 1 mm (0.2 mm in the case of Example 14 used for the evaluations described below).

Undercoat layer 20 is a film having a thickness of from 0.5 to 20 μm (5 μm in the case of Example 14 used for the evaluations described below) of a siloxane resin having silica particles dispersed therein for providing the film with anti-glare properties. The silica particles have an average particle size of from 0.1 to 5 μm (4 μm in the Example 14).

Undercoat layer 20 of Example 14 had a surface hardness in terms of pencil hardness of 5H, glossiness at 60°, Gs (60°) of 48, a center line average coarseness, Ra of 980 nm, and a haze of 15%.

Anti-reflection layer 30 has a thickness of from 0.05 to 1 μm (0.1 μm in Example 14), and is a layer having an ultra-low refractive index made of a porous silica-based amorphous substance. Anti-reflection layer 30 has a refractive index of from 1.25 to 1.45 (1.32 in Example 14). This anti-reflection layer 30 had a reflectance in air of about 0.5% in the whole range of visible wavelengths to confirm the high anti-reflection effect of the layer.

Anti-staining layer 40 is a layer of 1H,1H,2H,2H-perfluorodecyltrichlorosilane having a thickness of from 20 to 800 Å (up to 100 Å in Example 14). Anti-staining layer 40 had a contact angle with water of at least 100° to exhibit an excellent water repellency. Anti-staining layer 40 also had a refractive index, n of from 1.25 to 1.45, and accordingly, the nd (d: thickness of anti-staining layer 40) was confirmed to be smaller than 0.1 µm.

Polarizer plate 200(14) of Embodiment 14 and Example 14 was produced as follows. First, the siloxane resin coating solution having silica particles dispersed therein used in Embodiment 6 was coated onto the surface of resin film 50 by a dipping method. The siloxane resin was then thermally cured by heating the coated film to 70° C. to form undercoat layer 20.

Next, tetraethoxysilane was dissolved in a mixed solvent of ethylcellosolve and ethanol (in a composition ratio of 1:1), and pure water and a catalytic amount of hydrochloric acid were added to the solution. The resulting solution was agitated at room temperature to promote hydrolysis. To this solution, were added a dispersion of silica fine particles having an average particle size of from 50 to 1,000 Å (200 Å in Example 14), and the solution was thoroughly agitated to prepare the coating solution. The resulting solution was a uniform sol, which was highly stable to enable long-term storage without any precipitation.

The coating solution was applied to the surface of undercoat layer 20 by roll coating. The plate was then heated to a temperature of from 50° to 100° C. (80° C. in the Example 14), and irradiated with ultraviolet light with an intensity of 10 Joule to form anti-reflection layer 30. The thus formed anti-reflection layer 30 was confirmed to be very dense and homogeneous with no cracks. It was also found that the film thickness could be fully controlled in the order of approximately 100 Å.

The resulting film coated plate was dipped in 5% by weight Florinate FC-40 solution of 1H,1H,2H,2H-perfluorodecyltrichlorosilane at 20° C. for 1 minute. The film was removed from the solution at a speed of 10 cm/sec., and allowed to stand in an atmosphere at a relative humidity of 50% and a temperature of 50° C. for 10 minutes. The resulting film was washed with Florinate FC-40 to remove the fluorine-containing silane compound which failed to undergo the reaction. The film did not undergo any specific change in its appearance or anti-reflection properties by the formation of anti-staining layer 40.

The resulting resin film laminate was adhered onto polarizer substrate 10 with an acrylic adhesive, as used in Embodiment 2, to produce polarizer plate 200(14).

The properties of polarizer plate 200(14) were evaluated by repeating the procedures of Embodiment 1. Polarizer plate 200(14) exhibited good results comparable to those of the polarizer plate 100 of Embodiment 1 in a) adhesion, b) scuff resistance, c) chemical resistance, and d) anti-staining properties.

A liquid crystal display panel was also prepared by adhering polarizer plate 200(14) to the front surface of an active matrix drive liquid crystal panel utilizing TFT (thin film transistor) elements. The thus produced liquid crystal display panel was subjected to a) a high-humidity, high-temperature test, b) a thermal shock test, c) a daylight exposure test, and d) a visibility test by repeating the procedures of Embodiment 1. The liquid crystal display panel exhibited good results comparable to those of Embodiment 1 except for some glitter in the visibility test and was of overall acceptable quality.

EMBODIMENT 15 AND EXAMPLE 15

The polarizer plate of this example has a structure basically the same as that of Embodiment 1, and therefore, description is made by referring to FIG. 1 and polarizer plate 100(15).

Polarizer plate 100(15) has a structure including a polarizer substrate 10 having deposited thereon, undercoat layer 20, anti-reflection layer 30 on layer 20, and anti-staining layer 40 on layer 30,in this order. Polarizer substrate 10 is substantially the same as that used in Embodiment 1, and no further description is made.

Undercoat layer 20 is a film having a thickness of from 0.5 to 20 µm (3 µm in the case of Example 15 used for the evaluations described below) of an acrylic resin having silica particles dispersed therein for providing the film with anti-glare properties. The silica particles dispersed have an average particle size of from 0.1 to 5 µm (1 µm in Example 15) and are used in an amount of from 1 to 50% by weight (20% by weight in Example 15) per the amount of the acrylic resin used.

Undercoat layer 20 of Example 15 had a surface hardness in terms of pencil hardness of 3H, glossiness at 60°, Gs (60°) of 35, a center line average coarseness, Ra of 180 nm, and a haze of 13%.

Anti-reflection layer 30 is an acrylic resin layer of ultra-low refractive index with a thickness of from 0.05 to 1 µm (0.095 µm in Example 15). Anti-reflection layer 30 has a refractive index of from 1.25 to 1.45 (1.38 in Example 15). The exemplary acrylic resins are polymers of an acrylic ester monomer wherein a fluoroalkyl group is introduced in its ester residue, and a polymer of two or more fluoro-group-containing monomers.

Anti-staining layer 40 is a layer of bis(1H,1H-perfluorobutyl)diaminosilane having a thickness of from 20 to 800 Å (200 Å in Example 15). Anti-staining layer 40 had a contact angle with water of at least 100° to exhibit an excellent water repellency. Anti-staining layer 40 had a refractive index n of from 1.25 to 1.45, and accordingly, the nd (d: thickness of anti-staining layer 40) was confirmed to be smaller than 0.1 µm.

Next, an exemplary method for producing polarizer plate 100(15) of this example is described. An acrylic resin coating solution having silica particles dispersed therein, as used in Embodiment 1, was roll coated onto one surface of polarizer substrate 10, and the plate was irradiated with ultraviolet light to cure the acrylic resin and form undercoat layer 20.

Next, a fluoroalkylacrylate was dissolved in a fluorosolvent (bis(trifluoromethyl)benzene) to a concentration of 3% by weight to prepare the coating solution. The coating solution was coated on the surface of the polarizer plate by dipping, and the plate was heated to a temperature of from 30° to 100° C. (50° C. in Example 15) for 5 to 180 minutes (30 minutes in Example 15). The plate was irradiated with an electron beam at an acceleration voltage of 100 kV to form the acrylic resin anti-reflection layer 30. The thus formed anti-reflection layer 30 was confirmed to be very dense and homogeneous with no cracks. It was also confirmed that the film thickness could be fully controlled in the order of approximately 50 Å.

Next, a vacuum chamber was charged with a 9:1 gas mixture of argon and bis(1H,1H-perfluorobutyl)

diaminosilane at a vacuum of from 1 to 0.0001 Torr (0.01 Torr in Example 15). The atmosphere was plasmatized with a high frequency magnetic field of, for example, 13.56 MHz to deposit the fluorine-containing silane compound on anti-reflection layer 30, and to thereby form anti-staining layer 40. The film did not undergo any specific change in its appearance or anti-reflection properties by the deposition of anti-staining layer 40.

The properties of the thus produced polarizer plate 100 (15) were evaluated by repeating the procedures of Embodiment 1. Polarizer plate 100(15) exhibited good results comparable to those of polarizer plate 100 of Embodiment 1 in a) adhesion, b) scuff resistance, c) chemical resistance, and d) anti-staining properties.

A liquid crystal display panel was also prepared by adhering polarizer plate 100(15) onto the front surface of a simple matrix drive liquid crystal panel. The thus produced liquid crystal display panel was subjected to a) a high-humidity, high-temperature test, b) a thermal shock test, c) a daylight exposure test, and d) a visibility test by repeating the procedures of Embodiment 1. A sample having a reflection plate disposed on the back of the liquid crystal display panel was used in the visibility test. The liquid crystal display panel exhibited good results comparable to those of Embodiment 1.

EMBODIMENT 16 AND EXAMPLE 16

The polarizer plate of this example has a structure basically the same as that of Embodiment 1, and therefore, description is made by referring to FIG. 1 and polarizer plate 100(16).

Polarizer plate 100(16) has a structure including polarizer substrate 10, having deposited thereon, an undercoat layer 20, anti-reflection layer 30 on layer 20, and anti-staining layer 40 on layer 30, in this order. Polarizer substrate 10 is substantially the same as the one used in Embodiment 1, and no further description is made.

Undercoat layer 20 is a film of an acrylic resin having a thickness of from 0.5 to 20 μm (10 μm in the case of the sample (Example 16) used for the evaluation described below).

In contrast to the case of Embodiment 1, undercoat layer 20 does not have silica particles dispersed therein for providing anti-glare properties to the layer. Instead, the anti-glare properties are provided by forming undercoat layer 20 with minute surface irregularities by a transfer method.

Undercoat layer 20 of Example 16 had a surface hardness in terms of pencil hardness of 3H, glossiness at 60°, Gs (60°) of 90, a center line average coarseness, Ra of 100 nm, and a haze of 3%.

Anti-reflection layer 30 has a thickness of from 0.05 to 1 μm (0.21 μm in Example 16), and includes a layer of a titania-based amorphous substance with a high refractive index and a layer of a siloxane resin with a low refractive index. The layer of high refractive index material has a refractive index of from 1.5 to 2.0 (1.75 in Example 16), and the layer of low refractive index has a refractive index of from 1.3 to 1.5 (1.48 in Example 16). The layer of high refractive index material has dispersed therein titania particles having an average particle size of from 50 to 1000 Å (50 Å in the example). The layer of low refractive index material has dispersed therein silica particles having an average particle size of from 50 to 1000 Å (80 Å in the example).

Anti-reflection layer 30 was confirmed to be very dense and homogeneous with no cracks. This anti-reflection layer 30 also had a reflectance in air of 0.5% at 550 nm to confirm the high anti-reflection effect of the layer.

Anti-staining layer 40 is a layer of 1H,1H,2H,2H-perfluorooctyltriethoxysilane having a thickness of from 20 to 800 Å (up to 100 Å in the example). Anti-staining layer 40 had a contact angle with water of at least 100° and exhibited excellent water repellency. Anti-staining layer 40 also had a refractive index, n of from 1.25 to 1.45, and accordingly, the nd (d: thickness of anti-staining layer 40) was confirmed to be smaller than 0.1 μm.

Polarizer plate 100(16) of Example 16 was produced as follows. The acrylic resin coating solution used in Embodiment 4 was applied to one surface of polarizer substrate 10, and minute surface irregularities were formed on the surface of the coating by repeating the transfer procedure of Embodiment 4 to thereby complete undercoat layer 20.

The layer of high refractive index material was formed by dissolving tetrabuthoxytitanium in a mixed solvent of ethylcellosolve and ethanol (ethylcellosolve:ethanol=4:1) to a concentration of 20% by weight. A catalytic amount (about 0.3% by weight of the resulting coating solution) of acetic acid was added to the solution, and the resulting solution was agitated at room temperature. The titania particles described above were then dispersed in the solution which was thoroughly agitated to prepare the coating solution.

The resulting solution was a uniform sol, and could be stably stored for a prolonged period with no precipitation. The thus prepared coating solution was applied on the polarizer plate by spincoating, and the plate was heated to a temperature of from 50° to 100° C. (60° C. in Example 16) to form the layer of high refractive index including the titania-based amorphous substance.

The low refractive index material was prepared as follows. A quantity of γ-glycidoxypropyltrimethoxysilane was dissolved in methylcellosolve to a concentration of 20% by weight, and a catalytic amount (about 0.01% by weight of the coating solution) of hydrochloric acid was added to the solution.

The solution was agitated at room temperature. To the thus prepared solution were added the silica particles described above. Then, a catalytic amount (about 0.05% by weight of the coating solution) of magnesium perchlorate was added and the solution was thoroughly agitated to prepare the coating solution.

The resulting solution was a uniform sol, and could be stably stored for a prolonged period with no precipitation. The thus prepared coating solution was coated on the polarizer plate by dipping, and the polarizer plate was heated to a temperature of from 50° to 100° C. (60° C. in the sample) to form the siloxane resin layer of low refractive index to form two-layered anti-reflection layer 30.

The polarizer plate prepared by the above steps was exposed to oxygen plasma, and placed on a spinner. A solution of 3% by weight of 1H,1H,2H,2H perfluorooctyltriethoxysilane (the fluorine-containing silane compound) in Florinate FC-70 was dropped onto the polarizer plate. The spinner was rotated at a rotation speed of about 3,000 rpm to coat the polarizer plate with the solution. The thus coated polarizer plate was left in an atmosphere of a relative humidity of 50% and a temperature or 50° C. for 1 hour.

Then, the polarizer plate was washed with Florinate FC-70 to remove the fluorine-containing silane compound that failed to undergo the reaction to thereby leave behind anti-staining layer 40. The film did not undergo any specific change in its appearance or anti-reflection properties by the formation of anti-staining layer 40.

The properties of the resulting polarizer plate 100(16) were evaluated by repeating the procedures of Embodiment 1. Polarizer plate 100(16) exhibited good results comparable to those of polarizer plate 100 of Embodiment 1 in a) adhesion, b) scuff resistance, c) chemical resistance, and d) anti-staining properties.

A liquid crystal display panel was also prepared by adhering polarizer plate 100(16) onto the front surface of an active matrix drive liquid crystal panel utilizing MIM elements. The thus produced liquid crystal display panel was subjected to a) a high-humidity, high-temperature test, b) a thermal shock test, c) a daylight exposure test, and d) a visibility test by repeating the procedures of Embodiment 1. The liquid crystal display panel exhibited good results comparable to those of Embodiment 1.

EMBODIMENT 17 AND EXAMPLE 17

Polarizer substrate 10 of Embodiments 1 to 16 employs triacetylcellulose (TAC) for supporting layers 14 and 16 that are adhered to the polarizer layer 12. The TAC film has advantageous features such as high transparency, excellent gloss, and high anti-static effects, but it suffers from high water absorption. Hydrolysis of acetate is likely to be induced when the TAC film has absorbed water and the water is heated to an elevated temperature, resulting in a reduced physical strength of the film. Thus, the environmental reliability of the liquid crystal display panel will be primarily determined by the properties of the TAC employed.

When an anti-glare layer is formed on the surface of the polarizer plate, there would be no need to use an unreliable TAC film for the supporting layers of the polarizer substrate. Rather, films of more reliable materials such as polycarbonate (PC), polyethylene terephthalate (PET), polysulfone, polystyrene, and amorphous polyolefin may be selected for the supporting layer.

The polarizer substrate 10 of this embodiment and example uses PET for supporting layers 14 and 16. PET is a material with excellent heat resistance and mechanical properties.

The polarizer plate of this embodiment has a structure similar to polarizer plate 100 of FIG. 1 and will be identified as polarizer plate 100(17). It includes polarizer substrate 10 having undercoat layer 20 thereon, anti-reflection layer 30 on layer 20, and anti-staining layer 40, on layer 30, in this order.

Polarizer substrate 10 is formed of polarizer layer 12 wherein a polarizer such as an iodine compound or a dye that exhibits dichroism is fixedly adsorbed on a polarizing matrix such as polyvinylalcohol. Polarizer substrate 10 also includes a first supporting layer 14 and a second supporting layer 16 adhered to opposite surfaces of polarizer layer 12 by heat-lamination. Supporting layers 14 and 16, formed of PET, chemically and physically protect polarizer layer 12. Polarizer substrate 10 typically has a thickness of from 20 to 200 μm, and supporting layers 14 and 16 typically have a thickness of from 20 to 200 μm.

Undercoat layer 20, anti-reflection layer 30, and anti-staining layer 40 are similar to those used in Embodiment 1.

The properties of an example (Example 17) of polarizer plate 100(17) were evaluated by repeating the procedures of Embodiment 1. Polarizer plate 100(17) exhibited good results comparable to those of the polarizer plate 100 of Embodiment 1 in a) adhesion, b) scuff resistance, c) chemical resistance, and d) anti-staining properties.

A liquid crystal display panel similar to the one used in Embodiment 1 was also prepared by using polarizer plate 100(17). The thus produced liquid crystal display panel was subjected to a) a high-humidity, high-temperature test, b) a thermal shock test, c) a daylight exposure test, and d) a visibility test by repeating the procedures of Embodiment 1. The liquid crystal display panel exhibited good results comparable to those of Embodiment 1.

EMBODIMENT 18 AND EXAMPLE 18

In liquid crystal display panels, glass is usually used for the transparent substrates that sandwich the liquid crystal material because glass has excellent thermal stability, mechanical strength, and susceptibility to various processing. The situation is similar in active matrix drive liquid crystal display panels, and glass is generally used for the transparent substrates. Recently, plastic film panels (PFP) which have advantageous features such as thin film thickness, light weight, low production cost, and unbreakability are becoming popular and are used for devices such as pagers and the like.

The film generally used for the PFP transparent substrate generally includes a polyazilate base and gas barrier layers such as EVA layers are commonly disposed on opposite surfaces of the polyazilate base. Such transparent substrates generally have a thickness of from 50 to 500 μm.

A liquid crystal display utilizing a PFP for the transparent substrates may be produced by a process substantially the same as that of a liquid crystal display utilizing glass substrates. More illustratively, two transparent substrates can be provided, each having ITO transparent electrodes arranged in a comb-like pattern thereon. A polyimide orientation layer can be provided on the electrodes, said orientation layer having been rubbed for orientation. The substrates are then adhered to one another with a spacer disposed therebetween, and the liquid crystal is confined between the two transparent substrates.

A liquid crystal display panel of PFP type was prepared by adhering the polarizer plate 100 produced in Embodiment 1 of the present invention on the front surface of the liquid crystal display, and a conventional polarizer plate on the back surface of the liquid crystal display. The thus produced liquid crystal display panel was subjected to a) a high-humidity, high-temperature test, b) a thermal shock test, c) a daylight exposure test, and d) a visibility test by repeating the procedures of Embodiment 1. The liquid crystal display panel exhibited good results comparable to those of Embodiment 1.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A liquid crystal display device, having a liquid crystal display panel and a polarizer plate mounted on the display panel, the polarizer plate, comprising:

a polarizer substrate including a polarizer layer of polarizing material having two surfaces and having supporting layers disposed on both surfaces of said polarizer layer;

an organic resin undercoat layer having a haze, as is set forth in Japan Industrial Standard K 6900, of from 5% to 30% disposed on one of the surfaces of one of said supporting layers; and an outermost anti-staining layer disposed on said undercoat layer, said anti-staining layer including a fluorine-containing silane compound represented by the following formula (1):

$$(R^1)_a(R^2)_b-Si-Xc \qquad (1)$$

wherein:

$R^1$ is a fluorine-containing organic group;

$R^2$ is hydrogen or an organic group;

X is at least one hydrolyzable reactive amino group;

a is 1, 2, or 3;

b is 0, 1 or 2; and c is 1, 2, or 3;

or an oligomer or a polymer containing the unit represented by formula (1).

2. The liquid crystal display device of claim 1, wherein a resin film laminate is adhered to one of the supporting layers of the polarizer substrate, between the supporting layer and the undercoat layer.

3. The liquid crystal display device of claim 2, wherein said undercoat layer has a center line average coarseness according to JIS B 0601 of from about 100 to 500 nm.

4. The liquid crystal display device of claim 2, wherein said undercoat layer includes hard particles selected from the group consisting of silica, titania, alumina and zirconia particles and combinations thereof having an average particle size of from about 0.1 to 5 μm dispersed therein.

5. The liquid crystal display device of claim 2, wherein said undercoat layer includes at least one of acrylic resins or siloxane resins.

6. The liquid crystal display device of claim 2, wherein said fluorine-containing silane compound is at least one member selected from the group consisting of:
1H,1H,2H,2H-perfluorodecyltriaminosilane,
1H,1H,2H,2H-perfluorodecyldimethylaminosilane,
bis(1H,1H-perfluorobutyl)diaminosilane,
bis(perfluorononyl)diaminosilane,
perfluorohexadecyltriaminosilane,
perfluoroheptadecyltriaminosilane,
perfluorooctadecyltriaminosilane, and
bis(perfluorononyl)butylaminosilane.

7. The liquid crystal display device according to claim 2, wherein in said formula (1):

$R^1$ is at least one member selected from the group consisting of fluorine-containing alkyl and alkoxy groups having 1 to 20 carbon atoms;

$R^2$ is at least one member selected from the group consisting of hydrogen and alkyl and alkoxy groups having 1 to 4 carbon atoms.

8. The liquid crystal display device of claim 2, wherein said anti-staining layer has a refractive index n and a thickness d, which satisfy the following relations:

nd<0.1 μm, and 1.25<n<1.45.

9. The liquid crystal display device of claim 1, wherein said undercoat layer has a center line average coarseness according to JIS B 0601 of from about 100 to 500 nm.

10. The liquid crystal display device of claim 1, wherein said undercoat layer includes hard particles selected from the group consisting of silica, titania, alumina and zirconia particles and combinations thereof having an average particle size of from about 0.1 to 5 μm dispersed therein.

11. The liquid crystal display device of claim 1, wherein said undercoat layer includes at least one of acrylic resins or siloxane resins.

12. The liquid crystal display device of claim 1, wherein said fluorine-containing silane compound is at least one member selected from the group consisting of:
1H,1H,2H,2H-perfluorodecyltriaminosilane,
1H,1H,2H,2H-perfluorodecyldimethylaminosilane,
bis(1H,1H-perfluorobutyl)diaminosilane,
bis(perfluorononyl)diaminosilane,
perfluorohexadecyltriaminosilane,
perfluoroheptadecyltriaminosilane,
perfluorooctadecyltriaminosilane, and
bis(perfluorononyl)butylaminosilane.

13. The liquid crystal display device according to claim 1, wherein in said formula (1):

$R^1$ is at least one member selected from the group consisting of fluorine-containing alkyl and alkoxy groups having 1 to 20 carbon atoms; and $R^2$ is at least one member selected from the group consisting of hydrogen and alkyl and alkoxy groups having 1 to 4 carbon atoms.

14. The liquid crystal display device of claim 1, wherein said anti-staining layer has a refractive index n and a thickness d, which satisfy the following relations:

nd<0.1 μm, and 1.25<n<1.45.

15. A liquid crystal display device, having a liquid crystal display panel and a polarizer plate mounted on the display panel, the polarizer plate, comprising:

a polarizer substrate including a polarizer layer of polarizing material having two surfaces and having supporting layers disposed on both surfaces of said polarizer layer;

an organic resin undercoat layer having a haze, as is set forth in Japan Industrial Standard K 6900, of from 5% to 30% disposed on one of the surfaces of one of said supporting layers;

an anti-reflection layer disposed on said undercoat layer; and an outermost anti-staining layer disposed on said anti-reflection layer, said anti-staining layer including a fluorine-containing silane compound represented by the following formula (1):

$$(R^1)_a(R^2)_b-Si-Xc \qquad (1)$$

wherein:

$R^1$ is a fluorine-containing organic group;

$R^2$ is hydrogen or an organic group;

X is at least one hydrolyzable reactive amino group;

a is 1, 2, or 3;

b is 0, 1 or 2; and c is 1, 2, or 3;

or an oligomer or a polymer containing the unit represented by formula (1),
1H,1H,2H,2H-perfluorodecyltriaminosilane,
1H,1H,2H,2H-perfluorodecyldimethylaminosilane,
bis(1H,1H-perfluorobutyl)diaminosilane.

16. The liquid crystal display device of claim 15, wherein a resin film laminate is adhered to one of the supporting layers of the polarizer substrate, between the supporting layer and the undercoat layer.

17. The liquid crystal display device of claim 16, wherein said undercoat layer includes hard particles selected from the group consisting of silica, titania alumina and zirconia particles and combinations thereof having an average particle size of from about 0.1 to 5 µm dispersed therein.

18. The liquid crystal display device of claim 16, wherein said undercoat layer includes acrylic resins.

19. The liquid crystal display device of claim 16, wherein said undercoat layer includes siloxane resins.

20. The liquid crystal display device of claim 16, wherein said fluorine-containing silane compound is at least one member selected from the group consisting of:
1H,1H,2H,2H-perfluorodecyltriaminosilane,
1H,1H,2H,2H-perfluorodecyldimethylaminosilane,
bis(1H,1H-perfluorobutyl)diaminosilane,
bis(perfluorononyl)diaminosilane,
perfluorohexadecyltriaminosilane,
perfluoroheptadecyltriaminosilane,
perfluorooctadecyltriaminosilane, and
bis(perfluorononyl)butylaminosilane.

21. The liquid crystal display device as claimed in claim 16, wherein in said formula (1):

$R^1$ is at least one member selected from the group consisting of fluorine-containing alkyl and alkoxy groups having 1 to 20 carbon atoms; and $R^2$ is at least one member selected from the group consisting of hydrogen and alkyl and alkoxy groups having 1 to 4 carbon atoms.

22. The liquid crystal display device of claim 16, wherein said anti-staining layer has a refractive index n and a thickness d, which satisfy the following relations:

nd<0.1 µm, and 1.25<n<1.45.

23. The liquid crystal display device of claim 15, wherein said undercoat layer includes hard particles selected from the group consisting of silica, titania, alumina and zirconia particles and combinations thereof having an average particle size of from about 0.1 to 5 µm dispersed therein.

24. The liquid crystal display device of claim 15, wherein said undercoat layer includes acrylic resins.

25. The liquid crystal display device of claim 15, wherein said undercoat layer includes siloxane resins.

26. The liquid crystal display device of claim 15, wherein said fluorine-containing silane compound is at least one member selected from the group consisting of:
1H,1H,2H,2H-perfluorodecyltriaminosilane,
1H,1H,2H,2H-perfluorodecyldimethylaminosilane,
bis(1H,1H-perfluorobutyl)diaminosilane,
bis(perfluorononyl)diaminosilane,
perfluorohexadecyltriaminosilane,
perfluoroheptadecyltriaminosilane,
perfluorooctadecyltriaminosilane, and
bis(perfluorononyl)butylaminosilane.

27. The liquid crystal display device as claimed in claim 15, wherein in said formula (1):

$R^1$ is at least one member selected from the group consisting of fluorine-containing alkyl and alkoxy groups having 1 to 20 carbon atoms; and $R^2$ is at least one member selected from the group consisting of hydrogen and alkyl and alkoxy groups having 1 to 4 carbon atoms.

28. The liquid crystal display device of claim 15, wherein said anti-staining layer has a refractive index n and a thickness d, which satisfy the following relations:

nd<0.1 µm, and 1.25<n<1.45.

29. A liquid crystal display device, having a liquid crystal display panel and a polarizer plate mounted on the display panel, the poarizer plate, comprising:

a polarizer substrate including a polarizer layer of polarizing material having two surfaces and having supporting layers disposed on both surfaces of said polarizer layer;

an organic resin undercoat layer disposed on one of the surfaces of one of said supporting layers and having a center line average coarseness according to JIS B 0601 of from about 100 to 500 nm;

an outermost anti-staining layer disposed on said undercoat layer, said anti-staining layer including a fluorine-containing silane compound represented by the following formula (1):

$$(R^1)_a(R^2)_b\text{—Si—X}_c \qquad (1)$$

wherein:

$R^1$ is a fluorine-containing organic group;

$R^2$ is hydrogen or an organic group;

X is at least one hydrolyzable reactive amino group;

a is 1, 2, or 3;

b is 0, 1 or 2, and c is 1, 2, or 3; or an oligomer or a polymer containing the unit represented by formula (1).

30. The liquid crystal display device of claim 29, wherein a resin film laminate is adhered to one of the supporting layers of the polarizer substrate, between the supporting layer and the undercoat layer.

31. The liquid crystal display device of claim 29, wherein said undercoat layer includes hard particles selected from the group consisting of silica, titania, alumina and zirconia particles and combinations thereof having an average particle size of from about 0.1 to 5 µm dispersed therein.

32. The liquid crystal display device of claim 29, wherein said undercoat layer includes at least one of acrylic resins or siloxane resins.

33. The liquid crystal display device of claim 29, wherein said fluorine-containing silane compound is at least one member selected from the group consisting of:
1H,1H,2H,2H-perfluorodecyltriaminosilane,
1H,1H,2H,2H-perfluorodecyldimethylaminosilane,
bis(1H,1H-perfluorobutyl)diaminosilane,
bis(perfluorononyl)diaminosilane,
perfluorohexadecyltriaminosilane,
perfluoroheptadecyltriaminosilane, perfluorooctadecyltriaminosilane, and
bis(perfluorononyl)butylaminosilane.

34. The liquid crystal display device according to claim 29, wherein in said formula (1):

R$^1$ is at least one member selected from the group consisting of fluorine-containing alkyl and alkoxy groups having 1 to 20 carbon atoms; and R$^2$ is at least one member selected from the group consisting of hydrogen and alkyl and alkoxy groups having 1 to 4 carbon atoms.

35. The liquid crystal display device of claim 29, wherein said anti-staining layer has a refractive index n and a thickness d, which satisfy the following relations:

$$nd<0.1 \mu m,$$

and $$1.25<n<1.45.$$

36. A liquid crystal display device, having a liquid crystal display panel and a polarizer plate mounted on the display panel, the polarizer plate, comprising:

a polarizer substrate including a polarizer layer of polarizing material having two surfaces and having supporting layers disposed on both surfaces of said polarizer layer;

an organic resin undercoat layer disposed on one of the surfaces of one of said supporting layers and having a center line average coarseness according to JIS B 0601 of from about 100 to 500 nm; and an anti-reflection layer disposed on said undercoat layer; and an outermost anti-staining layer disposed on said anti-reflection layer, said anti-staining layer including a fluorine-containing silane compound represented by the following formula (1):

  (1)

wherein:

R$^1$ is a fluorine-containing organic group;

R$^2$ is hydrogen or an organic group;

X is at least one hydrolyzable reactive amino group;

a is 1, 2, or 3;

b is 0, 1 or 2; and c is 1, 2, or 3; or an oligomer or a polymer containing the unit represented by formula (1).

37. The liquid crystal display device of claim 36, wherein a resin film laminate is adhered to one of the supporting layers of the polarizer substrate, between the supporting layer and the undercoat layer.

38. The liquid crystal display device of claim 36, wherein said undercoat layer includes hard particles selected from the group consisting of silica, titania, alumina and zirconia particles and combinations thereof having an average particle size of from about 0.1 to 5 μm dispersed therein.

39. The liquid crystal display device of claim 36, wherein said undercoat layer includes acrylic resins.

40. The liquid crystal display device of claim 36, wherein said undercoat layer includes siloxane resins.

41. The liquid crystal display device of claim 36, wherein said fluorine-containing silane compound is at least one member selected from the group consisting of:
1H,1H,2H,2H-perfluorodecyltriaminosilane,
1H,1H,2H,2H-perfluorodecyldimethylaminosilane,
bis(1H,1H-perfluorobutyl)diaminosilane,
bis(perfluorononyl)diaminosilane,
perfluorohexadecyltriaminosilane,
perfluoroheptadecyltriaminosilane,
perfluorooctadecyltriaminosilane, and
bis(perfluorononyl)butylaminosilane.

42. The liquid crystal display device as claimed in claim 36, wherein in said formula (1):

R$^1$ is at least one member selected from the group consisting of fluorine-containing alkyl and alkoxy groups having 1 to 20 carbon atoms; and R$^2$ is at least one member selected from the group consisting of hydrogen, alkyl groups and alkoxy groups having 1 to 4 carbon atoms.

43. The liquid crystal display device of claim 36, wherein said anti-staining layer has a refractive index n and a thickness d, which satisfy the following relations:

$$nd<0.1 \mu m,$$

and $$1.25<n<1.45.$$

* * * * *